United States Patent
Aizawa et al.

(10) Patent No.: US 9,177,205 B2
(45) Date of Patent: Nov. 3, 2015

(54) IMAGE ATTRIBUTE DISCRIMINATION APPARATUS, ATTRIBUTE DISCRIMINATION SUPPORT APPARATUS, IMAGE ATTRIBUTE DISCRIMINATION METHOD, ATTRIBUTE DISCRIMINATION SUPPORT APPARATUS CONTROLLING METHOD, AND CONTROL PROGRAM

(75) Inventors: Tomoyoshi Aizawa, Kyoto (JP); Xiang Ruan, Kyoto (JP); Motoo Yamamoto, Kyoto (JP); Kiyoaki Tanaka, Kyoto (JP)

(73) Assignee: OMRON Corporation, Kyoto (JP)

( * ) Notice: Subject to any disclaimer, the term of this patent is extended or adjusted under 35 U.S.C. 154(b) by 448 days.

(21) Appl. No.: 13/033,375

(22) Filed: Feb. 23, 2011

(65) Prior Publication Data

US 2011/0222775 A1   Sep. 15, 2011

(30) Foreign Application Priority Data

Mar. 15, 2010   (JP) ................. 2010-058544

(51) Int. Cl.
G06K 9/46   (2006.01)
G06K 9/00   (2006.01)
G06K 9/32   (2006.01)

(52) U.S. Cl.
CPC .......... G06K 9/00664 (2013.01); G06K 9/3266 (2013.01)

(58) Field of Classification Search
CPC . G06K 9/325; G06K 9/3266; G06K 9/00664; G06K 9/46; G06K 9/6253; G06T 7/0081; G06T 2207/20144; H04N 1/622; H04N 1/62; G06F 17/30256

USPC ......................................................... 382/190
See application file for complete search history.

(56) References Cited

U.S. PATENT DOCUMENTS

| 6,175,663 | B1 * | 1/2001 | Huang ........................ 382/284 |
| 6,449,021 | B1 * | 9/2002 | Ohta et al. ................... 348/700 |
| 6,501,856 | B2 * | 12/2002 | Kuwano et al. .............. 382/194 |
| 7,991,232 | B2   | 8/2011 | Iwamoto |

(Continued)

FOREIGN PATENT DOCUMENTS

| JP | 11-298736 A | 10/1999 |
| JP | 2002-218480 A | 8/2002 |

(Continued)

OTHER PUBLICATIONS

European Search Report for Application No. 10196708 dated May 31, 2011 (3 pages).

(Continued)

*Primary Examiner* — Kim Vu
*Assistant Examiner* — Michael Vanchy, Jr.
(74) *Attorney, Agent, or Firm* — Osha Liang LLP

(57) ABSTRACT

An attribute of image data can accurately be discriminated. An image attribute discrimination apparatus includes a heterogeneous region extracting unit that specifies a heterogeneous region from image data. The heterogeneous region includes a heterogeneous matter whose attribute is different from that of a content originally produced by the image data. An image attribute discrimination apparatus further includes a scene discrimination unit that discriminates the attribute of the image data based on a feature quantity extracted from a pixel group except each pixel in the heterogeneous region in each pixel of the image data.

10 Claims, 15 Drawing Sheets

(56) References Cited

U.S. PATENT DOCUMENTS

| | | | |
|---|---|---|---|
| 2005/0028194 A1* | 2/2005 | Elenbaas et al. | 725/32 |
| 2005/0206734 A1* | 9/2005 | Kubo et al. | 348/207.1 |
| 2005/0220341 A1* | 10/2005 | Akahori | 382/170 |
| 2008/0002864 A1 | 1/2008 | Das et al. | |
| 2008/0143880 A1 | 6/2008 | Jung et al. | |

FOREIGN PATENT DOCUMENTS

| | | | |
|---|---|---|---|
| JP | 2005018176 A | 1/2005 | |
| JP | 2005-122720 A | 5/2005 | |
| JP | 2005-310123 A | 11/2005 | |
| JP | 2006331460 A | 12/2006 | |
| JP | 2008228087 A | 9/2008 | |

OTHER PUBLICATIONS

Victor Wu et al., vol. 21 No. 11 "Textfinder: An Automatic System to Detect and Recognize Text In Images", XP-000897103, Los Alamitos, CA, Nov. 1, 1999 (6 pages).

Qiang Zhu et al., "Multimodal Fusion Using Learned Text Concepts for Image Categorization", XP002639801, Santa Barbara, CA, Oct. 23, 2006 (10 pages).

Notification of Preliminary Rejection in corresponding Korean application No. 10-2011-0004955, mailed Jun. 12, 2012 (10 pages).

Notification of Reasons for Rejection in corresponding Japanese application No. 2010-058544, mailed Oct. 15, 2013 (8 pages).

Patent Abstracts of Japan, Publication No. 11-298736, Publication Date: Oct. 29, 1999, 1 page.

Patent Abstracts of Japan, Publication No. 2002-218480, Publication Date: Aug. 2, 2002, 1 page.

Patent Abstracts of Japan, Publication No. 2005-310123, Publication Date: Nov. 4, 2005, 1 page.

Patent Abstracts of Japan, Publication No. 2005-122720, Publication Date: May 12, 2005, 1 page.

Masatoshi Okutomi, et al., Digital Image Processing, CG-ARTS Society Press, Mar. 1, 2007 (2nd edition, 2nd print), pp. 311-313, Section 11-1 Region Feature Quantity.

Toshiyuki Amano, et al., Image Interpolation by BPLP using Eigen Space Method, IEICE Transaction, vol. J85-D-II, No. 3, pp. 457-465, 2002.

* cited by examiner

FIG. 2
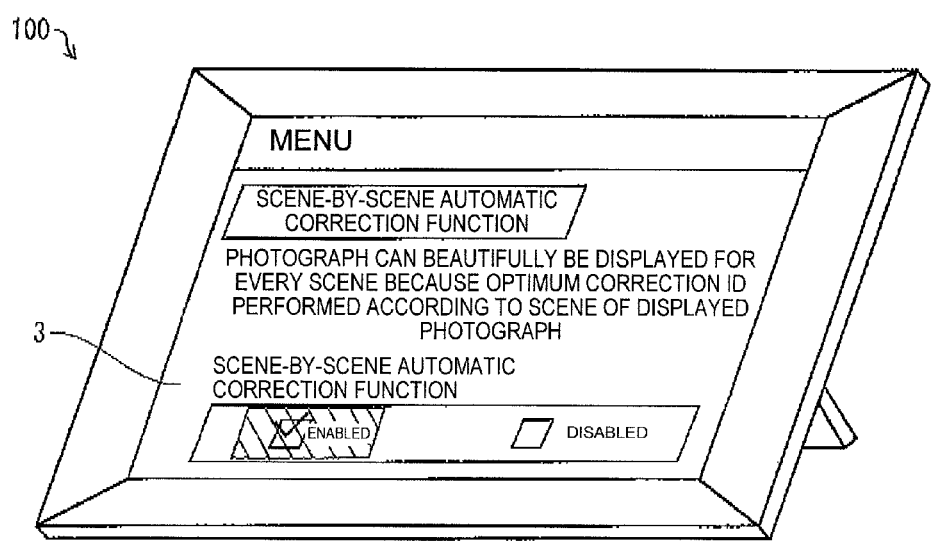
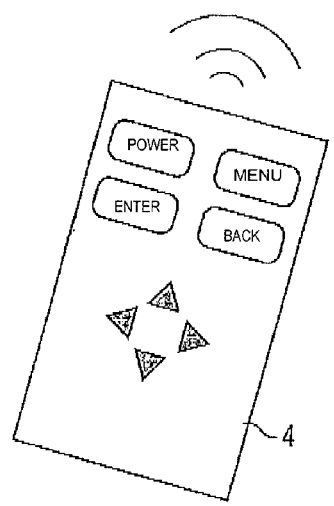

FIG. 7

| IMAGE DATA | CHARACTER REGION | CHARACTER RECOGNITION RESULT | DEGREE OF RELIABILITY | KEYWORD |
|---|---|---|---|---|
| Fujiyama.jpg | FIRST CHARACTER REGION Ar1 | [富士山] | 75 | 富士山, 山 |
| | FIRST CHARACTER REGION Ar2 | 標高 3,776 m | 70 | 標高 |
| | FIRST CHARACTER REGION Ar3 | 日本最高峰の山 | 60 | 日本,最高,峰,山 |

FIG. 8

| DISCRIMINATION RESULT | | DEGREE OF RELIABILITY |
|---|---|---|
| 1位 | LANDSCAPE | 60 |
| 2位 | BEACH | 20 |
| 3位 | SNOW | 15 |
| 4位 | COOKING | 3 |
| 5位 | NIGHT VIEW | 1 |
| ⋮ | ⋮ | ⋮ |

FIG. 9

| KEYWORD | SCENE | RELIABILITY POINT SCORE |
|---|---|---|
| 富士山 | LANDSCAPE | 50 |
| 山 | LANDSCAPE | 10 |
| 琵琶湖 | LANDSCAPE | 50 |
| 麻婆豆腐 | COOKING | 50 |
| チンジャオロース | COOKING | 50 |
| ⋮ | ⋮ | ⋮ |

IMAGE ATTRIBUTE DISCRIMINATION APPARATUS, ATTRIBUTE DISCRIMINATION SUPPORT APPARATUS, IMAGE ATTRIBUTE DISCRIMINATION METHOD, ATTRIBUTE DISCRIMINATION SUPPORT APPARATUS CONTROLLING METHOD, AND CONTROL PROGRAM

BACKGROUND OF THE INVENTION

1. Technical Field

One or more embodiments of the present invention relate to image attribute discrimination processing of discriminating an attribute of digital-format image data such as a still image and a moving image, particularly to an image attribute discrimination apparatus, an attribute discrimination support apparatus, an image attribute discrimination method, an attribute discrimination support apparatus controlling method, and a control program for improving accuracy of the image attribute discrimination processing.

2. Related Art

Recently, there is conducted research and development of a technique of analyzing a feature of image data to automatically discriminate an attribute of the image data. Specifically, a feature quantity is extracted from a pixel value possessed by any piece of image data such as the still image or moving image which is imaged with a digital camera, a digital video camera, or a camera-equipped mobile phone, the still image captured by a scanner, and the moving image or capture image which is recorded by a DVD recorder, and a scene (attribute) expressed by the image data is discriminated. For example, what kind of scene (such as person, landscape, night view, sunset, firework, room interior, snow, beach, flower, cooking, and business card and document) taken by the real-time image data processed by the digital camera is discriminated, which allows a photograph to be taken while a photographing mode of the digital camera is set to an optimum state according to the scene.

For example, Japanese Unexamined Patent Publication Nos. 11-298736 (published on Oct. 29, 1999), 2002-218480 (published on Aug. 2, 2002), 2005-310123 (published on Nov. 4, 2005), and 2005-122720 (published on May 12, 2005) disclose known image attribute discrimination processing techniques. In the techniques disclosed in Japanese Unexamined Patent Publication Nos. 11-298736, 2002-218480, 2005-310123, and 2005-122720, the feature quantity is extracted from target digital image data to perform processing of checking the feature quantity against a previously-prepared model feature quantity with respect to a specific scene, and a scene is discriminated based on a degree of coincidence with the feature quantity of the specific scene.

More specifically, in an image processing apparatus disclosed in Japanese Unexamined Patent Publication No. 11-298736, a determination whether the image data is the sunset scene is made using a histogram of hue data, and a determination whether the image data needs to be corrected is made based on the determination whether the image data is the sunset scene. The image processing apparatus makes the histograms of a value a product of the hue and chroma and a value of a product of the hue and lightness with respect to the pixels belonging to a range of red to yellow in the pixels constituting the target image data, and the image processing apparatus determines that a variance of the histogram that is larger than a specific reference is the image of the scene "sunset".

Japanese Unexamined Patent Publication No. 2002-218480 discloses an image photographing apparatus that discriminates a plurality of scenes such as "portrait", "sunset", and "night view" with respect to the target image data with information on the presence or absence of a person and information on a color histogram as a common feature index.

Japanese Unexamined Patent Publication No. 2005-310123 discloses an apparatus that accurately selects various images of specific scenes with respect to a feature portion corresponding to the specific scene in consideration of tendency of disposition in the image and in consideration of a position of photographing frame and a variation of area ratio by a photographing frame taking difference.

In an apparatus disclosed in Japanese Unexamined Patent Publication No. 2005-122720, reference data in which a kind of the feature quantity and an identifying condition are defined is prepared in each of the plurality of scenes designated as the specific scene in order to identify the scene, and scene discrimination is accurately performed by referring to the identifying condition.

However, in the conventional configurations, unfortunately the attribute cannot correctly be discriminated when a substance, a shadow, and a shape which are different from those of the original attribute of the image data (hereinafter referred to as a heterogeneous matter) are included in the image data that becomes the attribute discrimination target. That is, the feature obtained from a pixel group (hereinafter referred to as a heterogeneous region) taking the heterogeneous matter is different from the feature of the original attribute. Therefore, when the feature quantity of the whole image data is extracted while the feature quantity of the heterogeneous region is mixed in the feature quantity of the image data, the checking against the model feature quantity is not successfully performed, which results in false scene discrimination is performed to the image data or scene discrimination is performed with low likelihood.

For example, the generation of the heterogeneous region in the image data is attributed to objects, (also includes telop in the case of the moving image) such as a character, an illustration, a graphic, a stamp, and a graffiti, which are added to the image data that becomes the attribute discrimination target using an image edit tool in an image edit process. Additionally, sometimes an unintended phenomenon (such as a white spot phenomenon such as smear) emerges in the image data photographing process depending on a photographing environment or a subject state or an intended body such as a finger shadow is taken in the photograph. Additionally, sometimes an original plate or a backside color of an original is taken in a lack portion of the original in the process of scanning the origin such as the photograph (due to the broken original or folded original). The heterogeneous region is not limited to the above-described examples. The above problems are commonly generated irrespective of the condition, environment, and situation relating to the image data, when the attribute discrimination is performed to any piece of image data including the heterogeneous matter whose attribute is different from that of the original scene.

SUMMARY

One or more embodiments of the present invention realize an image attribute discrimination apparatus, an attribute discrimination support apparatus, an image attribute discrimination method, an attribute discrimination support apparatus controlling method, and a control program, which can accurately discriminate the attribute of the image data irrespective of the heterogeneous region of the image data.

In accordance with one aspect of one or more embodiments of the present invention, there is provided an image attribute discrimination apparatus that discriminates an attribute of image data based on a content produced by the image data, the image attribute discrimination apparatus including: a heterogeneous region specifying unit for specifying a heterogeneous region from the image data, the heterogeneous region including a heterogeneous matter whose attribute is different from that of the content originally produced by the image data; and an attribute discrimination unit for discriminating the attribute of the image data based on a feature quantity extracted from a pixel group except each pixel in the heterogeneous region in each pixel of the image data.

According to the configuration, the heterogeneous region specifying unit specifies the region including the heterogeneous matter (for example, the character string such as the telop) on the image data of the processing target, and the attribute discrimination unit discriminates the attribute of the image data based on the feature quantity that is obtained only from the pixel group of other region except the specified heterogeneous region.

Therefore, when the heterogeneous matter is included in the image data of the processing target, the adverse effect of the feature quantity extracted from the heterogeneous region on the attribute discrimination processing can be removed. As a result, the attribute discrimination accuracy can be improved.

The heterogeneous region specifying unit may specify a character region including a character as the heterogeneous region.

According to the configuration, even if the text object (character) added later to the photograph is merged to the image data of the processing target, the heterogeneous region specifying unit determines that the later-added character is the heterogeneous matter, and the region including the character is not used to extract the feature quantity. Accordingly, based on contents of the original image data located on the background of the character, the attribute can correctly be discriminated even to the image data to which the character edit is added.

The image attribute discrimination apparatus may further include a restoration unit for restoring a pixel identical to a target pixel with respect to an out-of-target pixel region in each pixel of the image data, the out-of-target region that does not become a feature quantity extracting target.

According to the configuration, the restoration unit restores the pixels in the background portion of the heterogeneous matter using information on the pixels surrounding the character string such that the pixels in the background portion become identical to the pixels surrounding the character string. The background portion of the heterogeneous matter is hidden behind the heterogeneous matter (such as the character string). The attribute discrimination unit performs the attribute discrimination processing based on the restored image data. Therefore, the feature quantity in the portion hidden behind the character string can effectively be utilized, and the accuracy of the attribute discrimination processing can be improved.

The image attribute discrimination apparatus may further include a target pixel determination unit for determining whether each pixel in the heterogeneous region specified by the heterogeneous region specifying unit is the target pixel whose feature quantity is extracted by the attribute discrimination unit, wherein the attribute discrimination unit discriminates the attribute of the image data based on the feature quantity extracted from the pixel group except the out-of-target pixel in each pixel of the image data, the out-of-target pixel being determined to be out of the target by the target pixel determination unit.

According to the configuration, the target pixel determination unit determines the target pixel and the out-of-target pixel in the pixels of the heterogeneous region specified by the heterogeneous region specifying unit. Accordingly, in extracting the feature quantity, the attribute discrimination unit does not refer to the pixel determined to be the out-of-target pixel by the target pixel determination unit, but the feature quantity is extracted only from the target pixel.

Therefore, because whether the pixel is the out-of-target pixel can more particularly be set in the heterogeneous region in extracting the feature quantity, and a degree of freedom of design is enhanced in implementing the image attribute discrimination apparatus that accurately and efficiently performs the attribute discrimination.

The heterogeneous region specifying unit specifies the character region including the character as the heterogeneous region, the image attribute discrimination apparatus further includes a character recognition unit for recognizing the character in the character region specified by the heterogeneous region specifying unit, and the target pixel determination unit preferably determines the pixel in the character region as the target pixel, when a degree of reliability of a character recognition result is not more than a predetermined value, the degree of reliability indicating likelihood that the character in the character region is the character recognized by the character recognition unit.

Generally, the numerical value of the degree of reliability outputted along with the character recognition result is increased when the character (string) is recognized more correctly, and the numerical value of the degree of reliability is decreased when the character recognition processing is performed while the matter that is not the character (string) is falsely extracted as the character string. Accordingly, only when the degree of reliability is more than a predetermined value, the region is determined to be the character region (heterogeneous region), and the pixels of the region are set to the out-of-target pixel. That is, the target pixel determination unit does not determine that the pixel having the low degree of reliability of the character recognition result is the out-of-target pixel even if the pixel having the low degree of reliability is initially determined to be the character region. Therefore, when the region that does not include the character (string) is falsely extracted as the character region, the falsely-extracted region is not set to the out-of-target pixel, which allows the target pixel determination unit to be prevented from failing to extract the feature quantity.

Therefore, the trouble that the accuracy of the attribute discrimination processing is degraded by expanding the out-of-target pixel in a blind way can be avoided.

The image attribute discrimination apparatus may further include a keyword extracting unit for extracting a keyword the character or character string recognized by the character recognition unit; and a word association storage unit in which association between each keyword extracted by the keyword extracting unit and each attribute discriminated by the attribute discrimination unit is stored, wherein the attribute discrimination unit refers to the word association storage unit, and the attribute discrimination unit discriminates the attribute of the image data in consideration of a level of association between the keyword extracted from the character region of the image data and each attribute.

According to the configuration, when the image data includes the character region, the character recognition unit extracts the character string included in the character region, and the keyword extracting unit extracts at least one word (keyword) from the character string.

The attribute discrimination unit refers to the word association storage unit to recognize the association between the extracted keyword and the attribute, and the attribute discrimination unit considers the level of the association between the keyword and the attribute in discriminating the attribute of the image data.

Frequently the character string such as the telop included in the image data includes the character string that indicates the attribute of the image data or has the deep association with the attribute. Accordingly, the attribute discrimination accuracy can be improved by setting character string to one of the indexes of the attribute discrimination processing. For example, the attribute discrimination unit determines that the keyword "山" and the attribute "landscape" have the high association, and a high weight is added to the attribute "landscape" in discriminating the attribute of the image data when the keyword "山" is extracted.

The attribute discrimination unit checks the feature quantity of the image data against a model feature quantity that is previously defined in each plurality of kinds of attributes, and the attribute discrimination unit discriminates the attribute of the image data by computing a degree of reliability of an attribute discrimination result according to a degree of similarity between the feature quantity of the image data and the model feature quantity, the degree of reliability indicating likelihood that the attribute of the image data is the attribute, and the association between the keyword and the attribute is stored in the word association storage unit as a score added to the degree of reliability of the attribute discrimination result.

According to the configuration, the level of the association is stored as the score added to the degree of reliability of the attribute discrimination result. The attribute discrimination unit outputs the degree of reliability with respect to each attribute that becomes a candidate in the image data, and the attribute discrimination unit adds the score correlated to the keyword to the degree of reliability of the correlated attribute. The high score is added to the attribute having the high association with the keyword, thereby improving the degree of reliability (likelihood that the image data is the attribute). Therefore, in consideration of the keyword included in the image data, the attribute discrimination unit can accurately discriminate the attribute of the image data based on the degree of reliability.

The image attribute discrimination apparatus may further include a restoration unit for restoring a pixel identical to a target pixel with respect to an out-of-target pixel region in each pixel of the image data, the out-of-target region that does not become a feature quantity extracting target, wherein the restoration unit preferably performs the restoration when the degree of reliability of the attribute discrimination result is lower than a predetermined value.

According to the configuration of the image attribute discrimination apparatus, the restoration processing having a high processing load is omitted when the preferable result, that is, the high likelihood (degree of reliability) of the discrimination result is obtained. Only when the attribute discrimination accuracy is degraded due to the low degree of reliability, the restoration processing is performed in order to improve the accuracy.

Accordingly, the balance between the improvement of the processing efficiency and the improvement of the attribute discrimination accuracy can be established.

The attribute discrimination unit may compute the degree of reliability lower with increasing region of the out-of-target pixel that does not become the feature quantity extracting target in each pixel of the image data.

The expanded region of the out-of-target pixel unit that a ratio of the pixel referred to in order to discriminate the attribute is decreased in one piece of image data, and possibly the attribute discrimination cannot precisely be performed compared with the case where all the pixels are referred to.

A user can be cautioned by underestimating the degree of reliability of the discrimination result outputted in such situations, or another countermeasure can be taken to improve the degree of reliability, which contributes to the improvement of the attribute discrimination accuracy.

The target pixel determination unit may determine each pixel in the heterogeneous region as the out-of-target pixel only when an area occupied by the heterogeneous region in the image data is more than a predetermined value.

According to the configuration, when the heterogeneous region specified by the heterogeneous region specifying unit is narrower (smaller) than a predetermined value, the target pixel determination unit does not perform the processing of determining that the pixel of the heterogeneous region is the out-of-target pixel.

Generally, for a small ratio of the area of the region including the heterogeneous matter to the area of the whole image data, the feature quantity obtained from the heterogeneous region has a small influence on the attribute discrimination. In this case, there is a small advantage that the discrimination accuracy is improved with respect to a processing time necessary to remove the heterogeneous region as the out-of-target region.

Therefore, as described above, the processing time can be shortened without largely influencing the discrimination accuracy by providing the restriction that the out-of-target pixel is specified only when the ratio of the heterogeneous region to the whole image data is not lower than the predetermined threshold.

The image attribute discrimination apparatus further includes a model feature quantity computing unit for computing a model feature quantity of a designated attribute using the feature quantity extracted from the pixel group except each pixel in the heterogeneous region specified by the heterogeneous region specifying unit in each pixel of the image data, when image data and the designation of the attribute of the image data are inputted to the image attribute discrimination apparatus, wherein the attribute discrimination unit may check the feature quantity of the image data against the model feature quantity computed in each attribute by the model feature quantity computing unit, and the attribute discrimination unit may discriminate the attribute of the image data according to a degree of similarity between the feature quantity of the image data and the model feature quantity.

According to the configuration, the attribute discrimination unit checks the feature quantity of the image data against the model feature quantity, and the attribute discrimination unit discriminates the attribute of the image data according to the degree of similarity of the checking result. Accordingly, in order to perform the accurate attribute discrimination, it is necessary that the model feature quantity be correctly defined according to each attribute.

Even if the image data including the heterogeneous matter (for example, the character string such as the telop) is captured as the image data of the learning target in the image attribute discrimination apparatus, the model feature quantity computing unit uses the image data after removing the heterogeneous matter specified by the heterogeneous region specifying unit, so that the model feature quantity can be produced more correctly. The attribute discrimination unit refers to the more correct model feature quantity, so that the attribute discrimination accuracy can be improved.

There is provided an attribute discrimination support apparatus according to one or more embodiments of the present invention that defines a model feature quantity in each attribute, an image attribute discrimination apparatus referring to the model feature quantity, the image attribute discrimination apparatus discriminating an attribute of image data based on a content produced by the image data, the attribute discrimination support apparatus including: a heterogeneous region specifying unit for specifying a heterogeneous region from image data when the image data and designation of the attribute of the image data are inputted, the heterogeneous region including a heterogeneous matter whose attribute is different from that of the content originally produced by the image data; and a model feature quantity computing unit for computing a model feature quantity of the designated attribute using a feature quantity from a pixel group except each pixel in the heterogeneous region in each pixel of the image data.

According to the configuration, when the image data and the designation the attribute of the image data are inputted in order to produce the model feature quantity, the heterogeneous region specifying unit specifies the heterogeneous region including the heterogeneous matter whose attribute is different from that of the original image data. Then, the model feature quantity computing unit computes the model feature quantity of the designated attribute using the feature quantity extracted from the pixel group except each pixel in the heterogeneous region.

Generally, the image attribute discrimination apparatus checks the feature quantity of the image data against the model feature quantity, and the attribute discrimination unit discriminates the attribute of the image data according to the degree of similarity of the checking result. Accordingly, in order to perform the accurate attribute discrimination, it is necessary that the model feature quantity be correctly defined according to each attribute.

Even if the image data including the heterogeneous matter (for example, the character string such as the telop) is captured as the image data of the learning target in the attribute discrimination support apparatus, the model feature quantity computing unit extracts and uses the feature quantity of the image data after removing the heterogeneous matter specified by the heterogeneous region specifying unit, so that the model feature quantity can be produced more correctly. The attribute discrimination unit refers to the more correct model feature quantity, so that the attribute discrimination accuracy can be improved.

There is provided an image attribute discrimination method according to one or more embodiments of the present invention for discriminating an attribute of image data based on a content produced by the image data, the image attribute discrimination method including the steps of: specifying a heterogeneous region from the image data, the heterogeneous region including a heterogeneous matter whose attribute is different from that of the content originally produced by the image data; and discriminating the attribute of the image data based on a feature quantity extracted from a pixel group except each pixel in the heterogeneous region in each pixel of the image data.

There is provided a method for controlling an attribute discrimination support apparatus according to one or more embodiments of the present invention that defines a model feature quantity in each attribute, an image attribute discrimination apparatus referring to the model feature quantity, the image attribute discrimination apparatus discriminating an attribute of image data based on a content produced by the image data, the discrimination support apparatus controlling method including the steps of: specifying a heterogeneous region from image data when the image data and designation of the attribute of the image data are inputted, the heterogeneous region including a heterogeneous matter whose attribute is different from that of the content originally produced by the image data; and computing a model feature quantity of the designated attribute using a feature quantity from a pixel group except each pixel in the heterogeneous region in each pixel of the image data.

The image attribute discrimination apparatus and the attribute discrimination support apparatus may be implemented by a computer. In such cases, control programs of the image attribute discrimination apparatus or attribute discrimination support apparatus that cause the computer to implement the image attribute discrimination apparatus or the attribute discrimination support apparatus by operating the computer as each of the units, and a computer-readable recording medium in which the control programs are recorded are also included in one or more embodiments of the present invention.

There is provided an image attribute discrimination apparatus according to one or more embodiments of the present invention that discriminates an attribute of image data based on a content produced by the image data, the image attribute discrimination apparatus including: a heterogeneous region specifying unit for specifying a heterogeneous region from the image data, the heterogeneous region including a heterogeneous matter whose attribute is different from that of the content originally produced by the image data; and an attribute discrimination unit for discriminating the attribute of the image data based on a feature quantity extracted from a pixel group except each pixel in the heterogeneous region in each pixel of the image data.

There is provided an attribute discrimination support apparatus according to one or more embodiments of the present invention that defines a model feature quantity in each attribute, an image attribute discrimination apparatus referring to the model feature quantity, the image attribute discrimination apparatus discriminating an attribute of image data based on a content produced by the image data, the attribute discrimination support apparatus including: a heterogeneous region specifying unit for specifying a heterogeneous region from image data when the image data and designation of the attribute of the image data are inputted, the heterogeneous region including a heterogeneous matter whose attribute is different from that of the content originally produced by the image data; and a model feature quantity computing unit for computing a model feature quantity of the designated attribute using a feature quantity from a pixel group except each pixel in the heterogeneous region in each pixel of the image data.

There is provided an image attribute discrimination method according to one or more embodiments of the present invention for discriminating an attribute of image data based on a content produced by the image data, the image attribute discrimination method including the steps of: specifying a heterogeneous region from the image data, the heterogeneous region including a heterogeneous matter whose attribute is different from that of the content originally produced by the image data; and discriminating the attribute of the image data based on a feature quantity extracted from a pixel group except each pixel in the heterogeneous region in each pixel of the image data.

There is provided a method for controlling an attribute discrimination support apparatus according to one or more embodiments of the present invention that defines a model feature quantity in each attribute, an image attribute discrimination apparatus referring to the model feature quantity, the image attribute discrimination apparatus discriminating an attribute of image data based on a content produced by the image data, the discrimination support apparatus controlling method including the steps of: specifying a heterogeneous region from image data when the image data and designation of the attribute of the image data are inputted, the heterogeneous region including a heterogeneous matter whose attribute is different from that of the content originally produced by the image data; and computing a model feature quantity of the designated attribute using a feature quantity from a pixel group except each pixel in the heterogeneous region in each pixel of the image data.

Accordingly, advantageously the attribute of the image data can accurately be discriminated irrespective of the heterogeneous region of the image data.

BRIEF DESCRIPTION OF THE DRAWINGS

FIG. 2 is a view showing an appearance of the digital photo frame of the embodiment;

FIG. 7 is a view showing specific examples of a character recognition result and a degree of reliability thereof, which are outputted by a character recognition unit of the digital photo frame;

FIG. 8 is a view showing specific examples of a scene discrimination result and a degree of reliability thereof, which are outputted by a scene discrimination unit of the digital photo frame;

FIG. 9 is a view showing a specific example a correspondence table expressing an association between a keyword and a scene, which is stored in a character score storage unit of the digital photo frame;

DETAILED DESCRIPTION

First Embodiment

Figure 1:
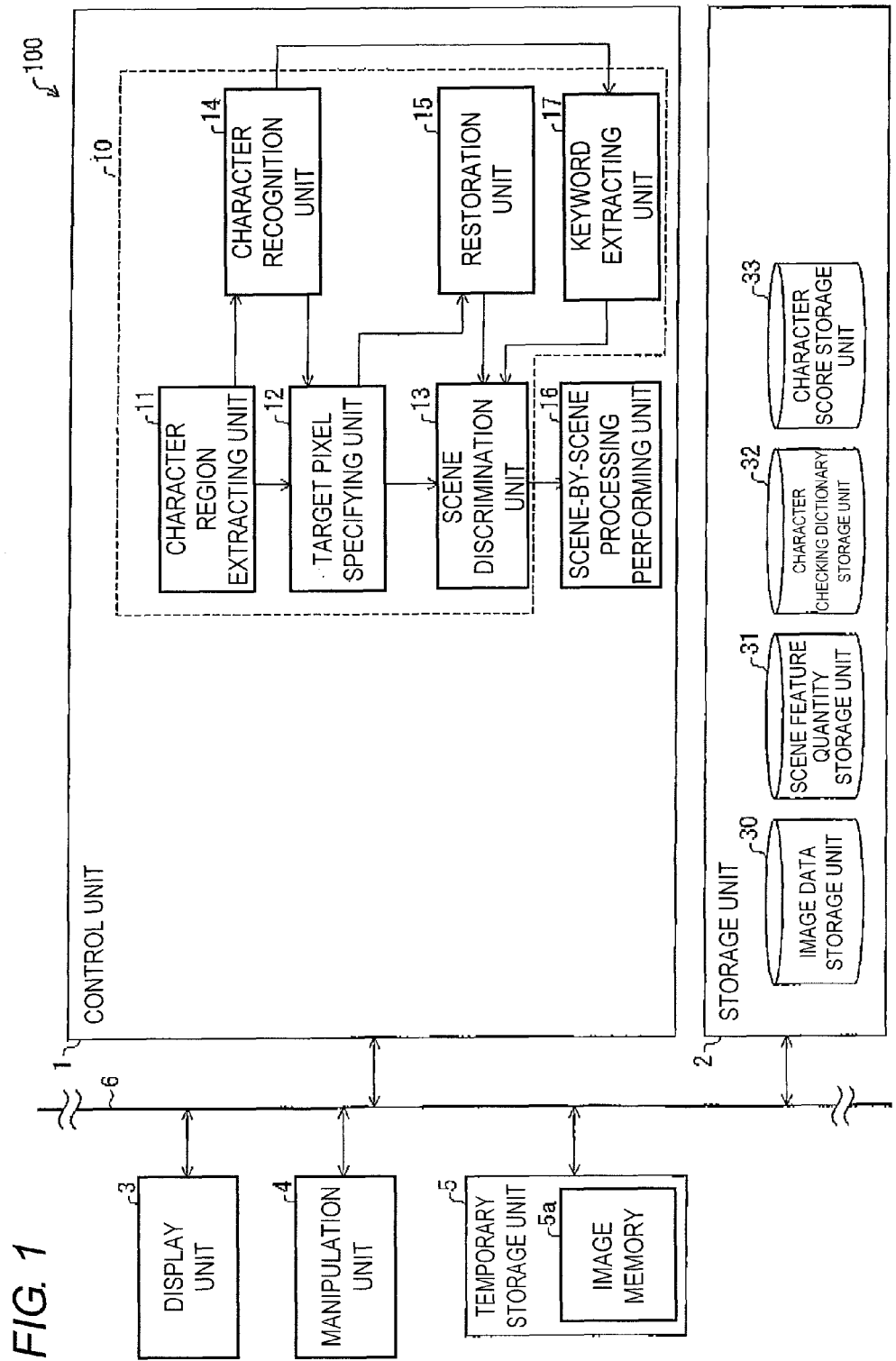
FIG. 1 is a block diagram showing a configuration of a main part of a digital photo frame according to one or more embodiments of the present invention.

Hereinafter, embodiments of the present invention will be described with reference to the drawings.

The case, in which an image attribute discrimination apparatus according to one or more embodiments of the present invention is applied to a digital photo frame that is an image display apparatus displaying image data, will be described below by way of example. A digital photo frame according to a first embodiment of the present invention can correct display data of image data to display the image data on a display unit of the image attribute discrimination apparatus according to a scene (attribute) of the image data discriminated by the image attribute discrimination apparatus. The image attribute discrimination apparatus of one or more embodiments of the present invention is not limited to the digital photo frame, but the image attribute discrimination apparatus can suitably be applied to various display devices, such as a digital camera, a digital video camera, a digital video recorder/player, a digital television, a personal computer, a printer, and a scanner, which can perform different processing to the image data in each discriminated scene.

[Appearance of Digital Photo Frame]

FIG. 2 is a view showing an appearance of the digital photo frame 100 of the first embodiment of the present invention. The digital photo frame 100 reads the image data and outputs the image data as display data to a display unit 3 to display an image. The image data such as one or a plurality of still images and moving images is stored in the digital photo frame 100 or recorded in a removable external recording medium. For example, the digital photo frame 100 displays a photograph (image data) taken with a digital camera on the display unit 3 to act as a picture frame. The digital photo frame 100 can sequentially display the plurality of photographs like slide show, display a plurality of pieces of image data at once with an arbitrary layout in arbitrary timing, and display a list of a large amount of image data in a thumbnail form.

A manipulation unit 4 of the digital photo frame 100 may be implemented by a button or a touch panel, which is provided in a main body of the digital photo frame 100, or use of a remote controller as shown in FIG. 2.

In the first embodiment, in order to improve the display of the image data, a digital photo frame 100 has a function (hereinafter referred to as scene-by-scene automatic correction function) of correcting the image data scene by scene to display the image. Various setting manipulations relating to functions of the digital photo frame 100 can be realized by the use of the manipulation unit 4.

For example, as shown in FIG. 2, the digital photo frame 100 may display a manipulation screen on the display unit 3 in order to cause a user to set whether the scene-by-scene automatic correction function is enabled. When enabling the scene-by-scene automatic correction function, the user manipulates an arrow key or an enter button provided in the manipulation unit 4 to select an option enabling the scene-by-scene automatic correction function.

[Configuration of Digital Photo Frame]

FIG. 1 is a block diagram showing a configuration of a main part of the digital photo frame 100 of the first embodiment of the present invention.

As shown in FIG. 1, the digital photo frame 100 of the first embodiment includes a control unit 1, a storage unit 2, the display unit 3, the manipulation unit 4, a temporary storage unit 5, and a bus 6. The bus 6 is a common signal line through which the data is transmitted and received among the units of the digital photo frame 100.

The control unit 1 performs various arithmetic operations by executing a program that is read from the storage unit 2 to the temporary storage unit 5, and wholly controls the units of the digital photo frame 100 through the bus 6. The control unit 1 includes at least a character region extracting unit 11 and a scene discrimination unit 13 as functional blocks. The control unit 1 may include a target pixel specifying unit 12, a character recognition unit 14, and a restoration unit 15 as functional blocks. In the digital photo frame 100, the functional block 11 to 15 acts as an image attribute discrimination apparatus 10 that performs a scene discrimination function. In the first embodiment, the control unit 1 includes a scene-by-scene processing performing unit 16 as a functional block. In the digital photo frame 100, the functional block 16 acts as an image processing apparatus that performs the scene-by-scene automatic correction function.

Each functional block of the control unit 1 can be realized, such that a CPU (central processing unit) reads a program stored in the storage unit 2 implemented by a ROM (Read Only Memory) to the temporary storage unit 5 implemented by a RAM (Random Access Memory) and executes the program.

A control program and an OS program, which are executed by the control unit 1, and various pieces of fixed data, which are read when the control unit 1 performs various functions (such as the scene discrimination function and the scene-by-scene automatic correction function of one or more embodiments of the present invention) possessed by the digital photo frame 100, are stored in the storage unit 2. In the first embodiment, for example, the storage unit 2 includes an image data storage unit 30, a scene feature quantity storage unit 31, a character checking dictionary storage unit 32, and a character score storage unit 33. Various pieces of fixed data are stored in the storage unit 2. For example, the storage unit 2 is implemented by a nonvolatile memory such as an EEPROM (Electrically EPROM) and a flash memory, in which contents are rewritable. A storage unit (such as the character checking dictionary storage unit 32 and the character score storage unit 33), in which information whose contents are not necessary to be rewritten is stored, may be implemented by a ROM (Read Only Memory, not shown) that is a read-only semiconductor memory separated from the storage unit 2.

The image data that is a target processed by the digital photo frame 100 as the image processing apparatus is stored in the image data storage unit 30. A feature quantity of a scene, which becomes a model referred to by the scene discrimination unit 13 when the scene discrimination unit 13 discriminates the scene of the image data, is stored in the scene feature quantity storage unit 31. Information on a character, which is referred to by the character recognition unit 14 when the character recognition unit 14 recognizes a character included in the image data, that is, a character checking dictionary is stored in the character checking dictionary storage unit 32, when the control unit 1 includes the character recognition unit 14. Score information is stored in the character score storage unit 33. The score information expresses association between a character (string) recognized by the character recognition unit 14 and a discriminated scene in the form of a numerical value (score).

As described above with reference to FIG. 2, the display unit 3 displays the image data captured from the image data storage unit 30 or from the external recording medium through an external interface (not shown), or displays a manipulation screen as a GUI (Graphical User Interface) screen on which the user manipulates the digital photo frame 100. For example, the display unit 3 includes a display device such as an LCD (Liquid Crystal Display) and an organic EL display.

The manipulation unit 4 is used when the user inputs an instruction signal to the digital photo frame 100 to manipulate the digital photo frame 100. As described above, in the first embodiment, the manipulation unit 4 is formed as the remote controller. When a button (such as the arrow key, the enter key, and a character input key) provided in the manipulation unit 4 is pressed down, a corresponding signal is outputted as an infrared signal from a light emitting portion of the manipulation unit 4, and the signal is inputted to the digital photo frame 100 through a light receiving portion provided in the main body of the digital photo frame 100.

The temporary storage unit 5 is a so-called working memory in which data used in an arithmetic operation and an arithmetic result are temporarily stored in processes of various pieces of processing performed by the digital photo frame 100. The temporary storage unit 5 is implemented by a RAM (Random Access Memory). More specifically, the control unit 1 expands the image data that becomes a scene discrimination processing target in an image memory 5a of the temporary storage unit 5, and analyzes the image data in detail in units of pixels.

The character region extracting unit 11 of the control unit 1 extracts a heterogeneous region included in the image data of the processing target. In the first embodiment, particularly the character region extracting unit 11 extracts a character region including a character (string) such as an alphanumeric character, a hiragana character, a katakana character, a kanji character, and a symbol as the heterogeneous region.

Figure 3A:
FIG. 3A is a view showing an example of original image data (Fujiyama.jpg) of a processing target.
Figure 3B:
FIG. 3B is a view showing a specific example of a region extracted as a character region from the image data of FIG. 3A.

FIG. 3A is a view showing an example of the original image data of the processing target. Although image data (file name: Fujiyama.jpg) shown in FIG. 3A is a photograph in which a landscape is originally taken, a text object is added to the landscape photograph in an image edit process in the image data. The character region extracting unit 11 specifies a character-like shape from a color difference with surrounding pixels and a texture, and the character region extracting unit 11 extracts a region including the character-like shape as the character region. FIG. 3B is a view showing an example of the region extracted as the character region from the image data of FIG. 3A. In the first embodiment, for example, as shown in FIG. 3B, the character region extracting unit 11 extracts a circumscribed rectangle having a character-string-like shape in a comprehensive way as the character region. In the example shown in FIG. 3B, the character region extracting unit 11 extracts a circumscribed rectangle of a character string "[富士山]" included in the original image data as a first character region Ar1, a circumscribed rectangle of a character string "標高" as a second character region Ar2, and a circumscribed rectangle of a character string "日本最高峰の山" as a third character region Ar3.

A well-known technique is appropriately adopted as the character region extracting technique (for example, see the technique disclosed in Masatoshi Okutomi, et al., "Digital Image Processing", CG-ARTS Society Press, Mar. 1, 2007 (2nd edition, 2nd print), P. 208 to 210, Section 11-1 "Region Feature Quantity".

The target pixel specifying unit 12 specifies whether each pixel of the heterogeneous region extracted by the character region extracting unit 11 becomes an analysis target of the scene discrimination processing. Specifically, the target pixel specifying unit 12 fixes a flag in each pixel. The flag indicates whether the pixel becomes the analysis target or the pixel out of the target. For example, the target pixel specifying unit 12 sets a flag "TRUE" indicating the analysis target to the pixel that becomes the analysis target, and the target pixel specifying unit 12 sets a flag "FALSE" indicating the pixel out of the analysis target to the pixel that does not become the analysis target. Therefore, the pixel that becomes the feature quantity analysis target is specified from the image data in the scene discrimination processing.

The target pixel specifying unit 12 may specify all the pixels in all the heterogeneous regions (character regions) extracted by the character region extracting unit 11 as the pixel out of the analysis target. That is, the three character regions shown in FIG. 3B of the first character region Ar1, second character region Ar2, and third character region Ar3 may be specified as the pixel out of the analysis target. Alternatively, based on a predetermined condition, the target pixel specifying unit 12 may specify only the pixel satisfying the condition in the heterogeneous regions extracted by the character region extracting unit 11 as the target pixel or the pixel out of the analysis target.

The scene discrimination unit 13 discriminates the scene of the image data. Particularly the scene discrimination unit 13 performs the analysis and the extraction of the feature quantity only to the pixel specified as the target pixel by the target pixel specifying unit 12 in all the pixels of the image data. The scene discrimination unit 13 discriminates the scene of the image data by checking the extracted feature quantity against a model feature quantity that is previously stored every scene in the scene feature quantity storage unit 31. In the first embodiment, for example, the scene discrimination unit 13 analyzes a pixel value for a region except the three character regions shown in FIG. 3B of the first character region Ar1, second character region Ar2, and third character region Ar3, and the scene discrimination unit 13 extracts the feature quantity.

In the first embodiment, the scene discrimination unit 13 produces a histogram of the target pixel as the whole feature quantity of the image data based on the color or texture of the target pixel. The scene discrimination unit 13 compares and checks the model feature quantity in each scene and the feature quantity extracted from the image data, and discriminates the scene of the most similar model feature quantity as the scene of the image data. The scene discrimination processing will be described in detail below.

Figure 4A:
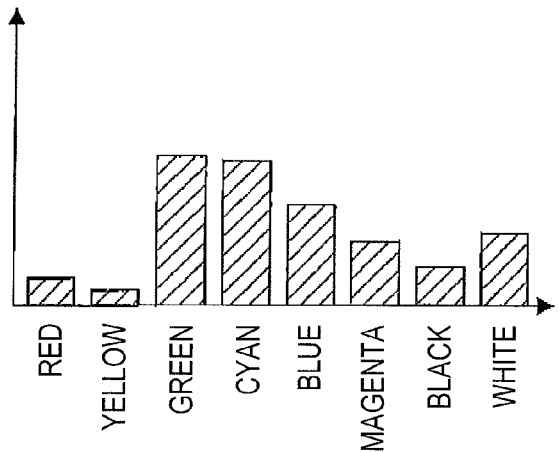
FIG. 4A is a view showing a specific example of a color histogram that is produced from a target pixel except the character region of FIG. 3B in the image data (Fujiyama.jpg) of FIG. 3A.

FIG. 4A is a view showing a specific example of a color histogram that is produced by the scene discrimination unit 13 from the target pixel except the character region of FIG. 3B in the image data (Fujiyama.jpg) of FIG. 3A.

Figure 4B:
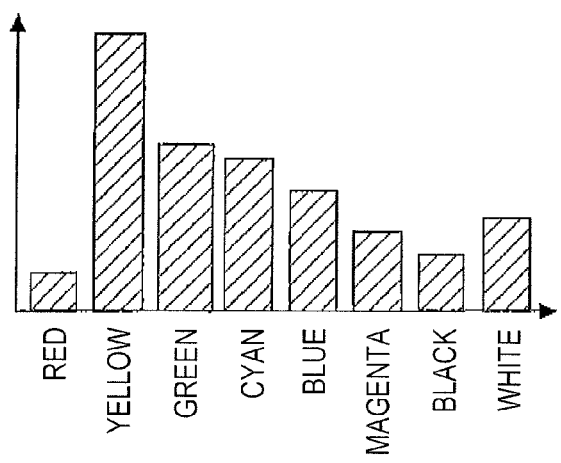
FIG. 4B is a view showing a specific example of a histogram that is produced from the image data of FIG. 3A while the character region is not excluded, that is, a histogram that is produced without applying one or more embodiments the present invention.
Figure 4C:
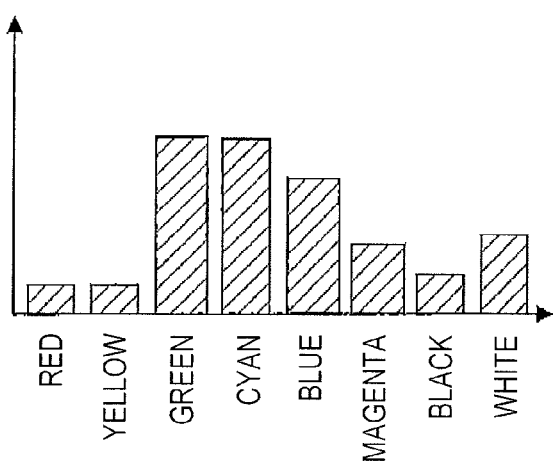
FIG. 4C is a view showing a specific example of a model histogram that is a previously-stored model feature quantity.

FIG. 4B is a view showing a specific example of a histogram that is produced from the image data of FIG. 3A while the character region is not excluded, that is, a histogram that is produced without applying one or more embodiments of the present invention, FIG. 4C is a view showing a specific example of a model histogram that is a model feature quantity stored in the scene feature quantity storage unit 31. For example, it is assumed that standard model histograms are previously stored in the scene feature quantity storage unit 31 with respect to 11 kinds of scenes of (1) person, (2) landscape, (3) night view, (4) sunset, (5) firework, (6) room interior, (7) snow, (8) beach (9) flower, (10) cooking, and (11) business card and document. The model histogram of FIG. 4C shows a specific example of the model histogram of "(2) landscape". In the histograms shown in FIGS. 4A to 4C, a horizontal axis indicates a bin corresponding to each color, and a vertical axis indicates frequency (the number of pixels)×edge intensity.

It is assumed that the text objects "[富士山]", "標高 3,776 m", and "日本最 高峰の山", which are included in the image data (Fujiyama.jpg) shown in FIG. 3A, include only yellow pixels.

The histogram of one or more embodiments of the present invention of FIG. 4A differs from the histogram of FIG. 4B in that it does not include yellow color intensity as the feature. This is because the target pixel specifying unit 12 excludes the character region including the yellow character string from the target pixel.

When the histogram of FIG. 4B is used while "yellow color intensity" is mixed, unfortunately a determination that the histogram of FIG. 4B is not similar to the model histogram of FIG. 4C is made, or unfortunately a reliable discrimination result is not obtained because the histogram of FIG. 4B has a low degree of similarity even if the determination that the histogram of FIG. 4B is similar to the model histogram of FIG. 4C is made.

On the other hand, according to the image attribute discrimination apparatus 10 of one or more embodiments of the present invention, because the feature quantity of "yellow color intensity" that is different from the original scene (attribute) can be excluded, the scene discrimination unit 13 determines that the degree of similarity becomes the highest between the histogram (FIG. 4A) obtained from the image data (Fujiyama.jpg) and the model histogram (FIG. 4C) of "(2) landscape", and the scene discrimination unit 13 can correctly discriminate the scene of the image data (Fujiyama.jpg) as "(2) landscape".

The scene discrimination unit 13 quantifies likelihood (probability that the image data is the scene) that the image data is the scene as a "degree of reliability" according to the degree of similarity between the feature quantity of the image data of the processing target and the model feature quantity, and the scene discrimination unit 13 may output the degree of reliability along with the discrimination result.

The degree of reliability of the scene discrimination result is increased as the feature quantity (histogram) extracted from the image data is similar to the model feature quantity stored in the scene feature quantity storage unit 31.

A well-known technique is appropriately adopted as the feature quantity extracting technique (for example, see the technique disclosed in Masatoshi Okutomi, et al., "Digital Image Processing", CG-ARTS Society Press, Mar. 1, 2007 (2nd edition, 2nd print), P. 208 to 210, Section 11-1 "Region Feature Quantity".

According to the configuration, in discriminating the scene of the image data, the character region extracting unit 11 extracts the heterogeneous region (for example, the text object with respect to the landscape photograph) when the image data includes the heterogeneous region. Then the target pixel specifying unit 12 specifies the pixel that is excluded from the analysis target for the purpose of the scene discrimination in the pixels of the heterogeneous region. Finally the scene discrimination unit 13 extracts the feature quantity from the pixel that is specified as the analysis target in all the pixels of the image data, and discriminates the scene of the image data based on the extracted feature quantity.

For the image data including the heterogeneous region different from the original scene, only the region except the heterogeneous region is analyzed to perform the scene discrimination. Therefore, advantageously the scene of the image data can accurately be discriminated irrespective of the heterogeneous region of the image data.

As described above, the control unit 1 may further include the character recognition unit 14 and the restoration unit 15.

The character recognition unit 14 recognizes the character (string) included in the character region when the heterogeneous region extracted by the character region extracting unit 11 is the character region that possibly includes the character (string). The character recognition unit 14 compares a model shape of any character stored in the character checking dictionary storage unit 32 and a character (-like) shape that is included in the character region and specified from the color or texture, and the character recognition unit 14 specifies the character (string) included in the character region.

In the example shown in FIG. 3B, the character recognition unit 14 recognizes the character string "[富士山]" from the first character region Ar1 extracted by the character region extracting unit 11, recognizes the character string "標高 3,776 m" from the second character region Ar2, recognizes the character string "日本最高峰の山" from the third character region Ar3, and outputs the character strings as the text data. The output text data is probably a word associated with the content of the image data. Therefore, the scene discrimination unit 13 may refer to the character score storage unit 33 to discriminate the scene of the image data in consideration of the association between the scene and the meaning of the word of the text data.

The character recognition unit 14 may quantify likelihood that the character (string) included in the character region is the recognized character (string) as the "degree of reliability" according to the degree of similarity of the model shape of the character, and the character recognition unit 14 may output the degree of reliability along with the recognition result. When the character recognition result has the low degree of reliability, the target pixel specifying unit 12 determines that something looks like the character included in the character region is actually not the character (that is, not the heterogeneous region), and the target pixel specifying unit 12 can take into account the fact in specifying the target pixel.

A well-known technique is appropriately adopted as the character recognition technique (for example, see the technique disclosed in Masatoshi Okutomi, et al., "Digital Image Processing", CG-ARTS Society Press, Mar. 1, 2007 (2nd edition, 2nd print), P. 208 to 210, Section 11-1 "Region Feature Quantity".

In order to set the pixel (heterogeneous region) that is specified as the pixel out of the analysis target by the target pixel specifying unit 12 to the feature quantity extracting target, the restoration unit 15 restores the pixel out of the analysis target such that the pixel out of the analysis target has a pixel value identical to that of the pixels of the analysis target based on the pixel value of the surrounding pixel of the analysis target.

Figure 5:
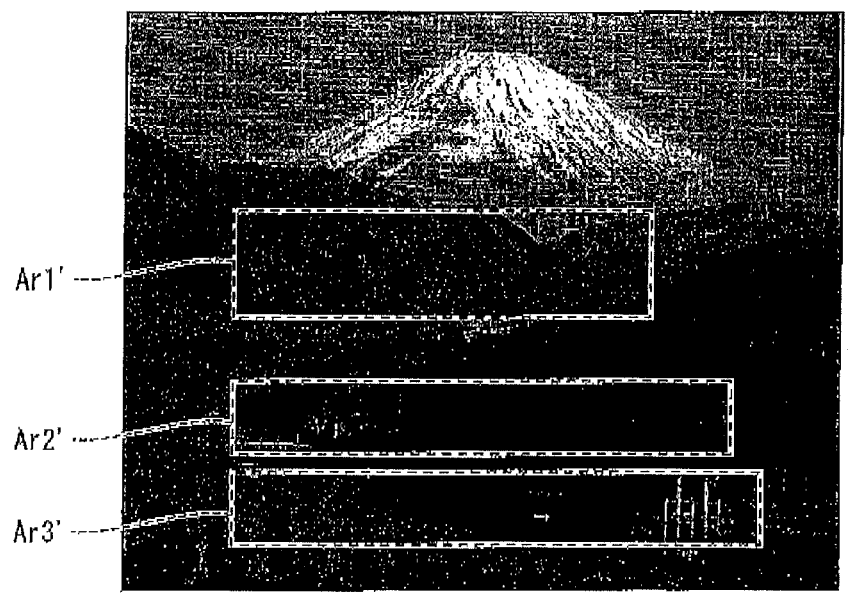
FIG. 5 is a view showing an example of the image data after restoration processing is performed to a heterogeneous region.

FIG. 5 is a view showing an example of the image data in which restoration processing is performed to the heterogeneous region. As shown in FIG. 5, the restoration unit 15 performs restoration processing to the first character region Ar1, second character region Ar2, and third character region Ar3, which are extracted as the heterogeneous character region in FIG. 3B, whereby the pixels whose attributes are identical (color, texture and the like match the landscape of Mount Fuji) to those of pixel in the region except the character regions Ar1, Ar2, and Ar3 are interpolated in the character regions Ar1, Ar2, and Ar3. The scene discrimination unit 13 refers to the restored restoration regions Ar1' to Ar3' for the purpose of the scene discrimination.

The target pixel specifying unit 12 re-specifies the pixels restored by the restoration unit 15 as the target pixel, the scene discrimination unit 13 performs the analysis and the extraction of the feature quantity to the newly-specified target pixel (restored pixel). Therefore, the region that is taken into account for the purpose of the scene discrimination can be widened with for the one piece of pixel data, and the accuracy of the scene discrimination result can be enhanced.

A well-known technique is appropriately adopted as the restoration technique (for example, see the technique disclosed in Toshiyuki Amano, et al., "Image Interpolation by BPLP using Eigen Space Method", IEICE Transaction, Vol. J85-D-II, No. 3, P. 457 to 465.

The scene-by-scene processing performing unit 16 performs different processing to the image data discriminated by the scene discrimination unit 13 scene by scene. In the first embodiment, the scene-by-scene processing performing unit 16 corrects the display data of the image data such that each discriminated scene is displayed in the most beautiful state. That is, the scene-by-scene processing performing unit 16 acts as an image data correction unit that performs the scene-by-scene automatic correction function in the digital photo frame 100.

Therefore, the digital photo frame 100 can be configured as the image processing apparatus that can beautifully display the scene of the image data while the scene is always corrected to the optimum state.

Specifically, the scene-by-scene processing performing unit 16 corrects the image data discriminated to be the scene of "firework" or "flower" in a brightly-colored manner by increasing a chroma of the display data, performs the correction in which a hue is slightly changed to highlight red to the image data discriminated to be the scene of "sunset", and performs the correction in which lightness is increased to create a positive atmosphere to the image data discriminated to be the scene of "room interior (event, party)".

[Scene Discrimination Processing Flow]

Figure 6:
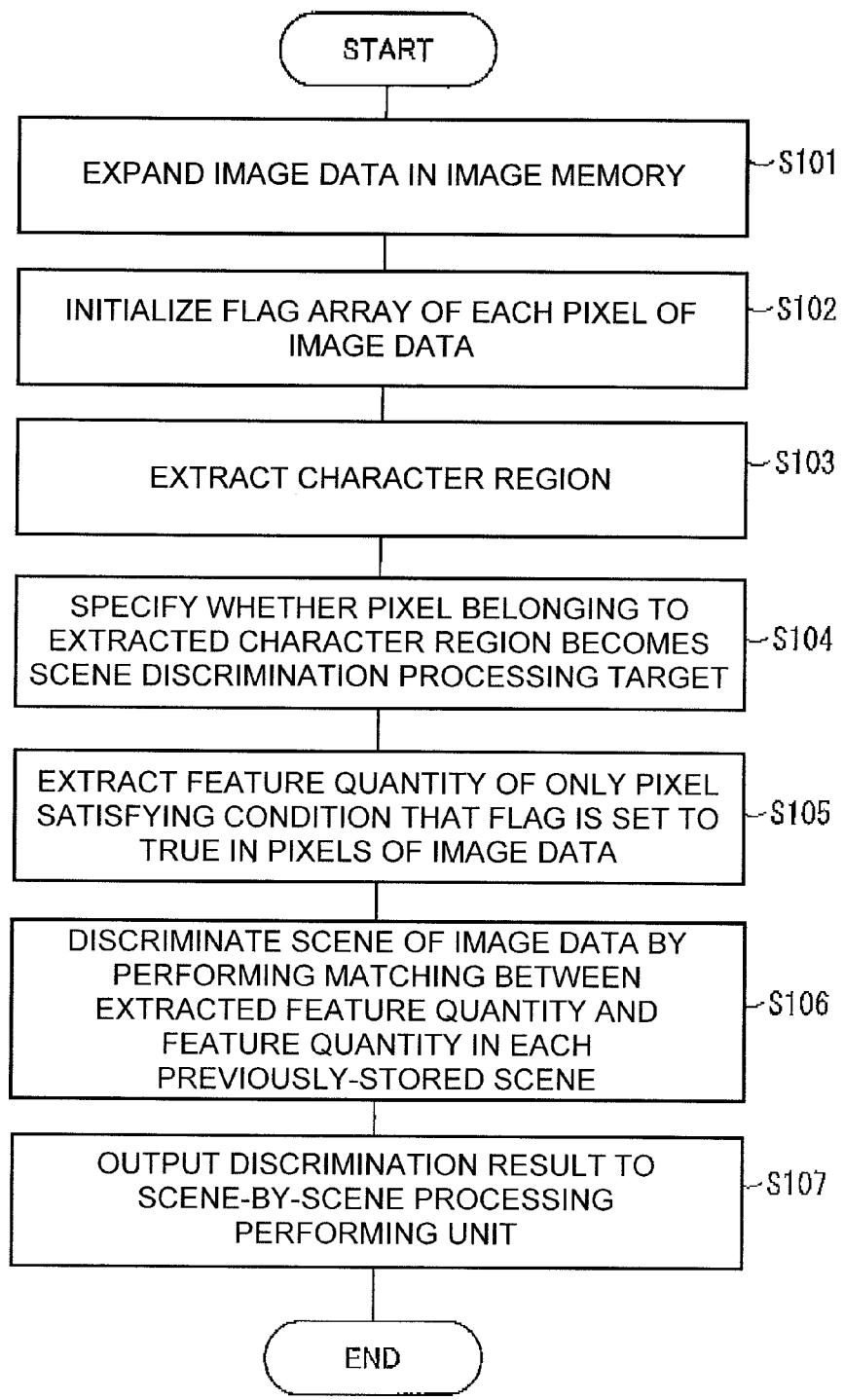
FIG. 6 is a flowchart showing a scene discrimination processing flow of the digital photo frame of the embodiment of the present invention.

FIG. 6 is a flowchart showing a scene discrimination processing flow of the digital photo frame 100 of the first embodiment.

The image attribute discrimination apparatus 10 expands the image data (for example, "Fujiyama.jpg" shown in FIG. 3A) that becomes the scene discrimination processing target from the image data storage unit 30 in the image memory 5a of the temporary storage unit 5 (S101). The target pixel specifying unit 12 defines a flag array of each pixel of the expanded image data and initializes the flag array (S102). For example, when the image data includes the pixels of a width (width of image data)×height (height of image data)=x pixels×y pixels, the target pixel specifying unit 12 defines a feature quantity extracting target flag array feat_use_flag[x][y]. In this case, when the heterogeneous region is not included, the target pixel specifying unit 12 initializes the flags of all the pixels to TRUE because basically the target pixel specifying unit 12 sets all the pixels of the image data to feature quantity extracting target. As described above, when the flag is "TRUE", the pixel is the feature quantity extracting target.

Then the character region extracting unit 11 extracts the character region as the heterogeneous region with respect to the image data expanded in the image memory 5a (S103). As shown in FIG. 3B, the character region extracting unit 11 extracts the three character regions of the first character region Ar1 to the third character region Ar3.

The target pixel specifying unit 12 specifies whether each pixel belonging to the extracted character region becomes the pixel of the feature quantity extracting target for the scene discrimination (S104). In the first embodiment, because the flags of all the pixels are set to "TRUE" by the initialization, the flag is set to "FALSE" with respect to the pixels in the three character regions. As described above, when the flag is "FALSE", the pixel is the pixel out of the feature quantity extracting target.

The scene discrimination unit 13 extracts the feature quantity only from the pixel satisfying the condition that the flag is "TRUE" in the pixels of the image data (S105). Specifically, the scene discrimination unit 13 produces a color histogram. The scene discrimination unit 13 checks the histogram produced in S105 against the model histogram of each scene stored in the scene feature quantity storage unit 31, thereby discriminating the scene of the image data (S106). For example, when determining that the degree of similarity becomes the maximum between the histogram (for example, FIG. 4A) obtained from the image data (Fujiyama.jpg) of the processing target and the model histogram (for example, FIG. 4C) of "(2) landscape" stored in the scene feature quantity storage unit 31, the scene discrimination unit 13 discriminates that the scene of the image data is "(2) landscape".

Finally the scene discrimination unit 13 outputs the scene discrimination result "(2) landscape" to the scene-by-scene processing performing unit 16 (S107).

Therefore, for example, the scene-by-scene processing performing unit 16 can correct the display data of the image data of FIG. 3A to output the display data to the display unit 3 such that the photograph of the landscape is displayed most beautiful based on the scene discrimination result "(2) landscape".

According to the configuration, in discriminating the scene of the image data, the character region extracting unit 11 extracts the heterogeneous region (such as the text object with respect to the landscape photograph) when the heterogeneous region is included in the image data. Then, for the purpose of the scene discrimination, the target pixel specifying unit 12 specifies the pixel excluded from the analysis target with respect to the pixels in the heterogeneous region. Finally, the scene discrimination unit 13 extracts the feature quantity of the image data except the pixel excluded from the analysis target in all the pixels of the image data, and the scene discrimination unit 13 performs the scene discrimination of the image data based on the extracted feature quantity.

For the image data including the heterogeneous region different from the original scene, only the region except the heterogeneous region is analyzed to perform the scene discrimination. Therefore, advantageously the scene of the image data can accurately be discriminated irrespective of the heterogeneous region of the image data.

In the above example, the text objects of "[富士山]", "標高 3,776 m", and "日本最高峰の山" are added to the photograph of Mount Fuji. For example, when the text objects are formed by the yellow pixels, the heterogeneous region having the color and texture that are not included in the usual landscape photograph of Mount Fuji is included in the image data. When the histogram is produced with respect to all the pixels while such a heterogeneous region is included, the histogram includes the shape that is not usually included in the original landscape scene (for example, FIG. 4B). When the matching is performed based on such a histogram, unfortunately the photograph is falsely discriminated to be another scene, or unfortunately only the discrimination result having the extremely low degree of reliability is obtained even if the photograph is discriminated to be the photograph of Mount Fuji.

On the other hand, in one or more embodiments of the present invention, the histogram is produced with respect to only the pixels (that is, the pixels constituting the landscape photograph of Mount Fuji) in the region except the yellow region, and the matching is performed based on the histogram. The scene discrimination processing can be performed while an adverse effect of "feature of strong yellow" that does not express the scene is prevented.

Second Embodiment

An additional configuration that more efficiently performs the scene discrimination processing while the configuration of the first embodiment is used as the basic configuration or an additional configuration that further improves the accuracy of the scene discrimination processing will be described in a second embodiment.

[Consideration of Area of Character Region]

The target pixel specifying unit 12 may determine whether the pixel becomes the analysis target in the scene discrimination processing according to a ratio of the character region extracted by the character region extracting unit 11 to the whole image data. Specifically, when an area ratio of the character region is not lower than a predetermined threshold, it is considered that the character region has a large influence on the scene discrimination processing of the image data, and the target pixel specifying unit 12 excludes the character region from the analysis target pixel (flag is set to FALSE). On the other hand, when an area ratio of the character region is lower than a predetermined threshold, it is considered that the character region has a small influence on the scene discrimination processing of the image data even if the character region is different from the original scene, and the target pixel specifying unit 12 leaves the flags of all the pixels of the image data TRUE.

According to the configuration, for the small adverse effect of the heterogeneous region, the target pixel specifying processing (processing of setting flag to FALSE/TRUE) can be omitted in target pixel specifying unit 12, so that the scene discrimination processing can efficiently be performed while the accuracy of the scene discrimination processing is maintained.

[Consideration of Likelihood that Character Region is Character]

Alternatively, when the character recognition unit 14 performs the character recognition processing to the character region, the target pixel specifying unit 12 may determine whether the pixel becomes the analysis target in the scene discrimination processing according to the degree of reliability of the character recognition result. FIG. 7 is a view showing specific examples of the character recognition result and the degree of reliability thereof, which are outputted by the character recognition unit 14. FIG. 7 shows an example of the result, in which the character recognition unit 14 performs the character recognition in each of the three character regions extracted from the image data (Fujiyama.jpg) by the character region extracting unit 11 and outputs the degree of reliability with respect to the character recognition result of each region.

Referring to the specific example of FIG. 7, when the degree of reliability is not lower than a predetermined threshold, the target pixel specifying unit 12 determines that probably the character (string) is included as the heterogeneous matter in the character region, and the target pixel specifying unit 12 sets the flags of all the pixels in the character region to FALSE. On the other hand, when the degree of reliability is lower than the predetermined threshold, the target pixel specifying unit 12 determines that the character (string) is actually not included in the region regarded as the character region, and leaves the flag of the pixel in the region TRUE. In the example shown in FIG. 7, when a score of "55" is the threshold of the degree of reliability, because the character recognition results of the three character regions of FIG. 3B have the scores of 55 or more, the target pixel specifying unit 12 sets the flags of all the pixels in the character region to FALSE.

According to the configuration, the target pixel specifying unit 12 re-determines that the region, which is not recognized as the character with specific likelihood by the character recognition unit 14 while once determined to be the character region by the character region extracting unit 11, is actually not the heterogeneous region including the heterogeneous matter. The target pixel specifying unit 12 then specifies the region as the analysis target in the scene discrimination processing. Therefore, the region falsely recognized as the character region can be prevented from being excluded from the analysis target, so that the accuracy of the scene discrimination processing can be improved.

[Output of Degree of Reliability of Scene Discrimination Result]

In performing the matching between the histogram of the image data of the processing target and the model histogram stored in the scene feature quantity storage unit 31, the scene discrimination unit 13 may output the degree of reliability of the scene discrimination result according to the degree of similarity. FIG. 8 is a view showing specific examples of a scene discrimination result and a degree of reliability thereof, which are outputted by the scene discrimination unit 13. In the example shown in FIG. 8, as a result of the matching performed by the scene discrimination unit 13, the histogram of the image data of FIG. 3B has the highest degree of similarity to the model histogram of the scene "landscape" and the degree of reliability has the score of "60". Then, the degree of reliability is computed according to the degree of similarity to the model histogram in the order of "beach", "snow", "cooking", and "night view".

The scene discrimination unit 13 discriminates the scene of the image data as the "landscape", and the scene discrimination unit 13 outputs the discrimination result to the scene-by-scene processing performing unit 16 along with the score of "60" of the degree of reliability. Alternatively, the scene discrimination unit 13 may perform another piece of processing when the degree of reliability is lower than the predetermined threshold.

For example, the scene discrimination unit 13 displays a message that the scene of the image data cannot be discriminated to the user or outputs the message to the scene-by-scene processing performing unit 16. In such cases, the scene-by-scene processing performing unit 16 may perform not scene-by-scene processing but default processing to the image data. Alternatively, the scene discrimination unit 13 clearly displays a message of the low degree of reliability to the user. In such cases, the user confirms the discrimination result, and the user can perform the correction when an error exists. According to the configuration, when the scene discrimination result is incorrect, the user can be prevented from overlooking the incorrect scene discrimination result.

The scene discrimination unit 13 may output the degree of reliability of the scene discrimination result while adding an area of the region out of the analysis target as the character region to the whole image data to the degree of reliability. Specifically, the number of pixels that become the analysis targets is decreased with increasing area of the character region, and the accuracy of the scene discrimination of the image data is degraded. Therefore, the scene discrimination unit 13 may adjust the score such that the degree of reliability of each scene shown in FIG. 8 is decreased with increasing area of the character region in the image data.

Therefore, the image attribute discrimination apparatus 10 can more precisely understand the degree of reliability of the scene discrimination result to perform a correct step corresponding to the degree of reliability.

[Restoration of Character Region]

For example, when the degree of reliability of the scene discrimination result is lower than a specific value, the restoration unit 15 performs the restoration processing to the heterogeneous region excluded from the analysis target, and the restoration unit 15 may perform the scene discrimination processing to the image data again while adding the pixel value of the restored region. When the number of pixels of the analysis target is increased, the scene discrimination processing can be performed with higher reliability. In the restoration region, the likelihood that the pixel value of the post-restoration is identical to the original pixel value is lower than that of the region of the target pixel to which the restoration is not performed. Therefore, when the histogram is produced, the scene discrimination unit 13 may add a weight to the feature quantity extracted from the restored pixel such that the feature quantity is multiplied by a coefficient of 0 to 1.

Irrespective of the degree of reliability, the restoration processing performed by the restoration unit 15 may be configured to be always performed to the pixel that is specified as the pixel out of the analysis target by the target pixel specifying unit 12. However, in the configuration, the restoration processing is performed while focusing on the low degree of reliability. Therefore, preferably an opportunity of the high-load restoration processing can be reduced to improve the processing efficiency of the whole of the image attribute discrimination apparatus 10.

[Consideration of Semantic Content of Character (String)]

In the image attribute discrimination apparatus 10 of the second embodiment, the character recognition result (for example, the character string shown in FIG. 7) may be used as one of indexes of the scene discrimination processing. That is, the degree of reliability may be computed in each scene of the scene discrimination result shown in FIG. 8 in consideration of what meaning of the word included in the recognized character string.

For example, the image attribute discrimination apparatus 10 also includes a keyword extracting unit 17 (shown in FIG. 1). The storage unit 2 includes the character score storage unit 33. The keyword extracting unit 17 extracts a keyword as a minimum unit of the characters (string) having the meaning by performing a morphological analysis to the character string that is recognized in each region by the character recognition unit 14. The keyword extracting unit 17 may be configured in any way. For example, the keyword extracting unit 17 may be configured to extract a substantive keyword from the character string. A correspondence table is stored in the character score storage unit 33. The correspondence table shows how many points of the degree of reliability are added to the scene in each keyword. That is, in the character score storage unit 33, the association between the keyword and the scene (attribute) is stored as the score that should be added to the degree of reliability.

In the example shown in FIG. 7, the keyword extracting unit 17 extracts the keywords "富士山" and "山" from the character string "[富士山]" of the first character region Ar1. Similarly the keyword extracting unit 17 extracts the keyword from the character string of the remaining regions.

Based on the keyword extracted by the keyword extracting unit 17, the scene discrimination unit 13 refers to the character score storage unit 33 to specify how many scores of the degree of reliability are added to the scene. The scene discrimination unit 13 adds the specified point score to the degree of reliability outputted in each scene. A specific example will be described below.

FIG. 9 is a view showing a specific example a correspondence table expressing an association between the keyword, scene, and the point score, which are stored in the character score storage unit 33. As shown in FIG. 9, the scene that becomes the point target and the point score are stored for every keyword in the correspondence table while correlated with each other.

For example, in a first record of the image data shown in FIG. 9, the case where the keyword "富士山" is included in the character region of the image data means that the score "50" is added to the degree of reliability of the scene "landscape" in the discrimination result (see FIG. 8) of the image data.

More particularly, the keyword extracting unit 17 extracts the total of seven keywords shown in FIG. 7, such as one keyword "富士山" and two keywords "山", which are recognized by the character recognition unit 14, from the character strings of the three character regions. As shown in FIG. 7, the keyword extracted by the keyword extracting unit 17 may be stored while correlated with the character region or the keyword may collectively be stored while correlated with the image data (Fujiyama.jpg).

After outputting the scene discrimination result of FIG. 8 through the scene discrimination processing described in the first embodiment, the scene discrimination unit 13 refers to the correspondence table (FIG. 9) of the character score storage unit 33 based on the keyword extracted by the keyword extracting unit 17.

The scene discrimination unit 13 adds the point score "50 points×1=50 points" of the keyword "富士山" to the degree of reliability of the scene "landscape". The scene discrimination unit 13 adds the point score "10 points×2=20 points" of the keyword "山" to the degree of reliability of the scene "landscape". The scene discrimination unit 13 does not add the point score for the four keywords except the keywords "富士山" and "山" when the four keywords are not stored in the character score storage unit 33. That is, the scene discrimination unit 13 adds the point score "70" to the score "60" of the degree of reliability of the scene "landscape" of FIG. 8 to obtain the final score "130", and the scene discrimination unit 13 outputs the final score "130" of the degree of reliability of the scene "landscape".

Thus, the scene discrimination result can be outputted with higher reliability by adding the semantic content of the character string included in the image data to the scene discrimination result of the image data. Frequently, the word associated deeply with the scene of the image data is included in the character string such as the telop and the photograph title, and therefore the accuracy of the scene discrimination result can be improved by setting the word to one of the indexes of the scene discrimination processing.

[Scene Discrimination Processing Flow]

Figure 10A:
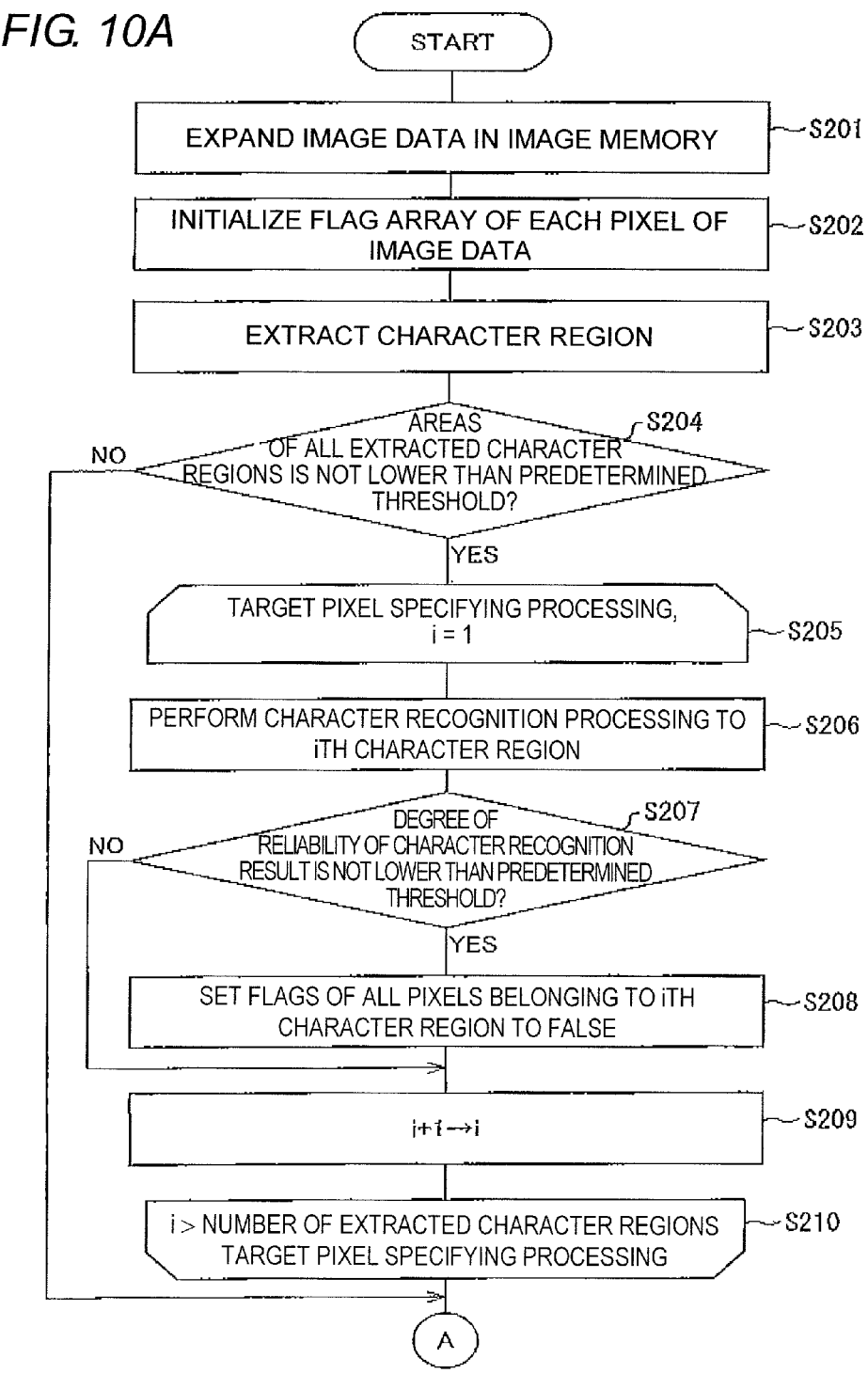
FIG. 10A is a flowchart showing an example of the scene discrimination processing flow of the digital photo frame of the embodiment of the present invention.
Figure 10B:
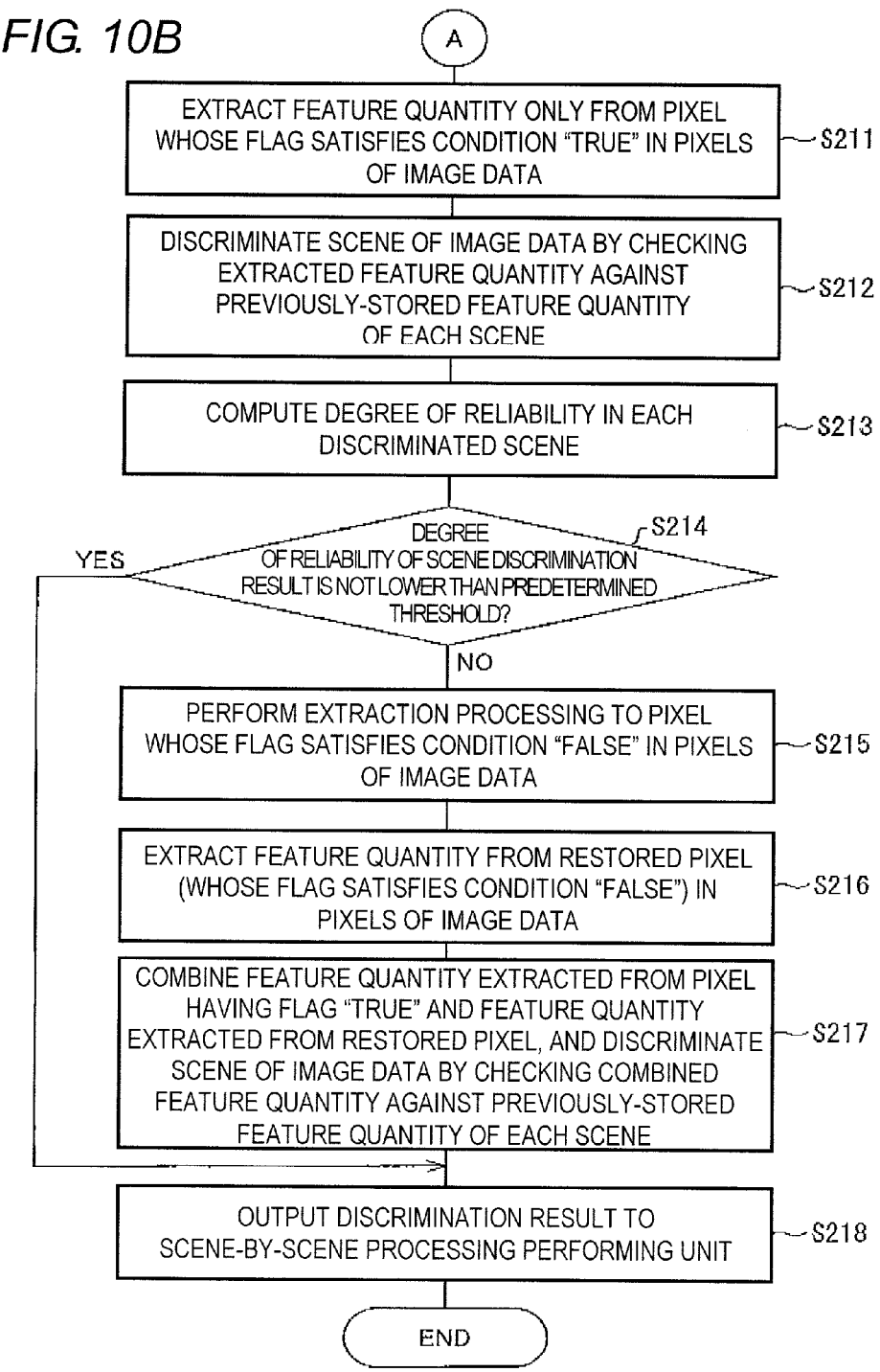
FIG. 10B is a flowchart showing an example of the scene discrimination processing flow of the digital photo frame of the embodiment of the present invention.

FIGS. 10A and 10B are flowcharts each showing an example of the scene discrimination processing flow of the digital photo frame 100 of the second embodiment.

Similarly to the method in S101 to S103 of FIG. 6, the image attribute discrimination apparatus 10 reads the image data (Fujiyama.jpg) that becomes the processing target from the image data storage unit 30 to expand the image data (Fujiyama.jpg) in the image memory 5*a* (S201). The target pixel specifying unit 12 defines the flag array of each pixel of the expanded image data to initialize the flag array to TRUE (S202). The character region extracting unit 11 extracts the character region as the heterogeneous region with respect to the image data expanded in the image memory 5*a* (S203). As shown in FIG. 3B, the character region extracting unit 11 extracts the three character regions of the first character region Ar1 to the third character region Ar3.

The target pixel specifying unit 12 specifies whether each pixel belonging to the extracted character region becomes the pixel of the feature quantity extracting target for the scene discrimination. Particularly, the target pixel specifying unit 12 determines whether areas of all the character regions extracted from the image data by the character region extracting unit 11 is not lower than a predetermined threshold or lower than a predetermined threshold (S204). When the total area of all the character regions is lower than the predetermined threshold (NO in S204), it is considered that the character region (heterogeneous region) has a small adverse effect on the scene discrimination processing of the image data, the target pixel specifying processing is not performed, all the pixels of the image data are set to the analysis target, and the flow goes to the scene discrimination processing (FIG. 10B) of S211 and thereafter.

On the other hand, when the total area of all the character regions is not lower than the predetermined threshold (YES in S204), the flow goes to the target pixel specifying processing from S205 and thereafter. In S205, the target pixel specifying unit 12 substitutes an initial value 1 for a variable i. The processing of maintaining the flag TRUE or the processing of changing the flag to FALSE is performed to each pixel of the ith character region.

Specifically, the character recognition unit 14 performs the character recognition processing to the ith character region (S206). As shown in FIG. 7, the character recognition unit 14 outputs the character recognition result of the ith character region and the degree of reliability of the character recognition result. In this case, the keyword extracting unit 17 may extract the keyword from the character (string) recognized by the character recognition unit 14. Alternatively, the keywords may collectively be extracted at the end after the character recognition processing is completed for all the regions.

The target pixel specifying unit 12 refers to the degree of reliability of the character recognition result in the character region, outputted from the character recognition unit 14, to determine whether the degree of reliability of the character recognition result is not lower than the predetermined threshold or lower than a predetermined threshold (S207). When the degree of reliability of the character recognition result is lower than the predetermined threshold (NO in S207), the target pixel specifying unit 12 determines that there is a high possibility that the ith region regarded as the character region is actually not the character region (that is, the ith region does not include the heterogeneous matter), and the target pixel specifying unit 12 leaves the flag of each pixel in the region TRUE. That is, the target pixel specifying unit 12 determines that each pixel of the region is not excluded from the analysis target for the scene discrimination.

On the other hand, when the degree of reliability of the character recognition result is not lower than the predetermined threshold (YES in S207), the target pixel specifying unit 12 determines that there is a high possibility that the character region includes the character (string) that has the adverse effect on the scene discrimination, and the target pixel specifying unit 12 sets the flag of each pixel in the character region to FALSE (S208). That is, the target pixel specifying unit 12 determines that each pixel of the character region is excluded from the analysis target for the scene discrimination. When the flag of each pixel is specified as TRUE or FALSE with respect to one character region, the target pixel specifying unit 12 increments i by one (S209), the target pixel specifying unit 12 specifies whether the next character region becomes the analysis target pixel in the similar procedure, and the target pixel specifying unit 12 repeats the processing for all the character regions extracted by the character region extracting unit 11. When the target pixel specifying unit 12 ends the target pixel specifying processing for all the character regions (for example, all the three character regions) (S210), the scene discrimination unit 13 performs the scene discrimination processing to the image data (Fujiyama.jpg).

The scene discrimination unit 13 extracts the feature quantity (produces the histogram) only from the pixel whose flag satisfies the condition "TRUE" in the image data by the method similar to that in S105 and S106 of FIG. 6 (S211), and checks the extracted feature quantity against the model feature quantity (model histogram) of each scene to discriminate the scene of the image data (S212). The scene discrimination unit 13 computes the degree of reliability for the scene discriminated as the scene of the image data and the scenes from the second-place scene, based on factors such as the degree of similarity between the feature quantity of the image data and the model feature quantity of each scene, the keyword included in the character region obtained by the character recognition unit 14 and keyword extracting unit 17, and the size of the character region out of the target (S213). For example, the scene discrimination unit 13 outputs the scene discrimination result and the degree of reliability of the scene discrimination result like "(first place) scene: landscape, degree of reliability: 130".

The scene discrimination unit 13 determines how much likelihood that the scene of the image data (Fujiyama.jpg) is the discriminated scene (for example, "landscape"). For example, the scene discrimination unit 13 determines whether the "degree of reliability: 130" is not lower than a predetermined threshold or lower than a predetermined threshold (S214). When the degree of reliability of the scene discrimination result is not lower than predetermined threshold, the scene discrimination unit 13 determines that the discriminated scene is almost certainly correct, and outputs the scene discrimination result to the scene-by-scene processing performing unit 16. For example, the scene discrimination unit 13 outputs the discrimination result that the scene of the image data (Fujiyama.jpg) is the "landscape" to the scene-by-scene processing performing unit 16 (S218).

On the other hand, when the degree of reliability of the scene discrimination result is lower than predetermined threshold, the scene discrimination unit 13 determines that it is doubtful that the scene of the image data is actually the scene, and the image attribute discrimination apparatus 10 performs the processing of improving the accuracy of the discrimination result. Specifically, the restoration unit 15 performs the restoration processing of removing the heterogeneous matter to each pixel in which the target pixel specifying unit 12 sets the flag to FALSE (S215). A well-known restoration technique is applied to this restoration processing.

The scene discrimination unit 13 extracts the feature quantity from each pixel having the flag "FALSE", which is restored by the restoration unit 15 (S216). The scene discrimination unit 13 combines the histogram of each pixel having the flag "FALSE" and the histogram of each pixel having the flag "TRUE", which is produced in S211, and performs the matching between the combined histogram and the model histogram of each scene to perform the scene discrimination of the image data again (S217). Therefore, the scene discrimination result of the image data (Fujiyama.jpg) and the degree of reliability of the scene discrimination result are determined again, and the discrimination unit 13 outputs the scene having the highest degree of reliability as the scene of the image data to the scene-by-scene processing performing unit 16 (S218).

Therefore, the scene-by-scene processing performing unit 16 can perform the processing to the image data (Fujiyama.jpg) according to the scene "landscape". For example, the scene-by-scene processing performing unit 16 has the scene-by-scene automatic correction function, and the scene-by-scene processing performing unit 16 can perform the image processing to the image data such that the landscape photograph is displayed the most beautiful, and display the image data on the display unit 3.

Thus, according to the above method, a balance between the efficiency of the scene discrimination processing and the improvement of the accuracy of the scene discrimination processing can be established in the image attribute discrimination apparatus 10 according to the performance and usage environment of the image attribute discrimination apparatus 10.

The image attribute discrimination apparatus 10 of one or more embodiments of the present invention need not include all the additional configurations of the second embodiment. In consideration of the information processing ability, usage, and usage environment of the apparatus that realizes one or more embodiments of the present invention, the configuration of the image attribute discrimination apparatus 10 is selectively designed as appropriate such that the efficiency of the scene discrimination processing and the improvement of the accuracy of the scene discrimination processing can be realized in a balanced manner.

[Method for Extracting Character Region]

In the above embodiments, as shown in FIG. 3B, the character region extracting unit 11 extracts the character-string-like circumscribed rectangle that collects to some extent as the character region from the image data. However, the character region extracting unit 11 of one or more embodiments of the present invention is not limited to the above embodiments.

Figure 11:
FIG. 11 is a view showing another specific example of the region extracted as the character region from the image data of FIG. 3A.
Figure 12:
FIG. 12 is a view showing still another specific example of the region extracted as the character region from the image data of FIG. 3A.

FIGS. 11 and 12 are views showing another example of the region that is extracted by the character region extracting unit 11 as the character region from the image data of FIG. 3A.

For example, as shown in FIG. 11, the character region extracting unit 11 may extract the character-like circumscribed rectangle as the character region in one character unit. In such cases, disadvantageously the number of regions is increased to apply the processing load on the image attribute discrimination apparatus 10 when the target pixel specifying unit 12 performs the target pixel specifying processing. At the same time, the number of pixels that are ignored as the pixel out of the analysis target can be decreased rather than the case where the character region is largely classified into the three regions as shown in FIG. 3B. Accordingly, advantageously the accuracy of the scene discrimination processing can be improved.

Alternatively, as shown in FIG. 12, the character region extracting unit 11 may exactly extract not the circumscribed rectangle of the heterogeneous matter but only the pixels in which the heterogeneous matter (such as the character) is photographed from the color or texture. In such cases, while the processing load is further increased in the character region extracting unit 11 and target pixel specifying unit 12, the number of pixels that are ignored as the pixel out of the analysis target can largely be decreased, and therefore the accuracy of the scene discrimination processing can further be improved.

Third Embodiment

In the first and second embodiments, the image attribute discrimination apparatus 10 can accurately and efficiently discriminate the attribute (scene) of the image data irrespective of the heterogeneous region of the image data. The image attribute discrimination apparatus 10 discriminates the scene by checking the model feature quantity that is previously learned by the scene feature quantity storage unit 31 against the feature quantity of the image data. Accordingly, in order to perform the accurate scene discrimination, it is necessary that the model feature quantity correctly reflect the feature according to the scene. An attribute discrimination support apparatus 20 according to a third embodiment of the present invention more precisely produces the model feature quantity of each scene, which is learned by the scene feature quantity storage unit 31.

The attribute discrimination support apparatus 20 of one or more embodiments of the present invention performs a scene learning function. In the scene learning function, the attribute discrimination support apparatus 20 receives image data of a sample that becomes a learning target while correlating the image data with a correct scene, extracts the feature quantity from the image data, and learns the feature quantity as part of the model feature quantity of the designated scene. For example, a plurality of pieces of image data whose scenes are categorized into the "landscape" are previously prepared, the feature quantities are extracted from the pieces of image data, and an average value of the feature quantities is used as the model feature quantity of the scene "landscape".

Accordingly, when the image data inputted as the sample includes the heterogeneous region (the character string such as the telop), the model feature quantity includes the feature different from the original feature of the scene. For example, usually the image data "landscape" does not include the yellow character shape, but the heterogeneous yellow text object deforms the original model feature quantity in an incorrect direction. Unless the model feature quantity correctly reflects the feature according to the scene, unfortunately the accuracy of the scene discrimination processing is degraded when the processing is performed using the model feature quantity.

Therefore, when the heterogeneous region is included in the image data of the inputted sample, the attribute discrimination support apparatus 20 of one or more embodiments of the present invention determines the feature quantity after detecting and removing the heterogeneous region, and the attribute discrimination support apparatus 20 adds the feature quantity to the model feature quantity of the designated scene. Therefore, the precise scene feature quantity can be produced irrespective of the heterogeneous region of the image data, and the image attribute discrimination apparatus 10 can accurately discriminate the attribute of the image data irrespective of the heterogeneous region.

The attribute discrimination support apparatus 20 may be applied to various pieces of image processing apparatus such as the digital photo frame 100 used by the user. Alternatively, the attribute discrimination support apparatus 20 of one or more embodiments of the present invention may be implemented by an information processing apparatus that produces the model feature quantity stored in the scene feature quantity storage unit 31 of the image processing apparatus based on a large amount of sample image data in a production stage of the image processing apparatus.

[Configuration of Digital Photo Frame]

Figure 13:
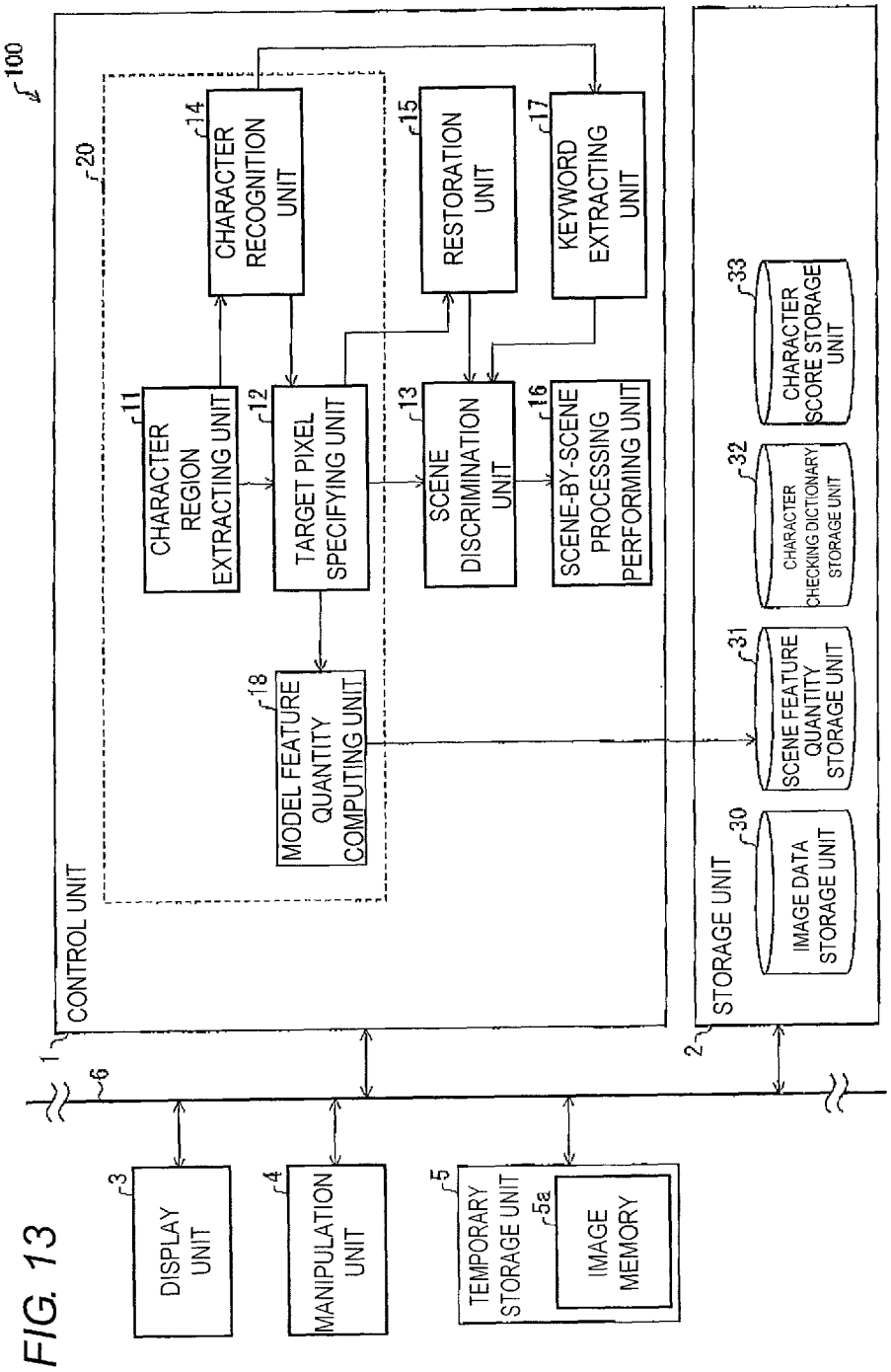
FIG. 13 is a block diagram showing a configuration of a main part of a digital photo frame according to another embodiment of the present invention.

FIG. 13 is a block diagram showing a configuration of a main part of a digital photo frame 100 of the third embodiment of the present invention. The reference numeral of each constituent of FIG. 13 corresponds to the reference numeral of each constituent of FIG. 1, and the same reference numeral expresses the same constituent. Accordingly, the overlapping description of the constituent that is already described in the first and second embodiments will not be given.

The digital photo frame 100 of the third embodiment differs from the digital photo frame 100 shown in FIG. 1 in that the control unit 1 further includes a model feature quantity computing unit 18 as a functional block. The scene feature quantity computing unit 18 and other functional blocks (particularly, the character region extracting unit 11, the target pixel specifying unit 12, and the character recognition unit 14) act as the attribute discrimination support apparatus 20 that performs the scene learning function. The attribute discrimination support apparatus 20 may further include the restoration unit 15.

The attribute discrimination support apparatus 20 receives the image data of the sample that becomes the learning target while correlating the image data with the designated correct scene. There is no particular limitation to the method for receiving the input. For example, the user loads an external recording medium in which the image data to be learned is recorded on the digital photo frame 100, and the digital photo frame 100 captures the image data through an external interface (not shown). The user manipulates the digital photo frame 100 using the manipulation unit 4, designates the correct scene correlated with the captured image data, and issues an instruction to perform the learning. The attribute discrimination support apparatus 20 registers the received image data to the image data storage unit 30 while correlating the image data with the inputted correct scene. The registered image data may be used as the image data displayed on the display unit 3 while used in the scene learning processing.

When the learning instruction is issued, the character region extracting unit 11 processes the image data that is received as the learning target, and extracts the heterogeneous region (in this case, the character region) when the heterogeneous region is included in the image data.

The target pixel specifying unit 12 specifies whether each pixel in the character region extracted by the character region extracting unit 11 becomes the target pixel of the feature quantity extraction. Similarly to the above embodiments, the target pixel specifying unit 12 sets the flag of the target pixel to TRUE and sets the flag of the pixel out of the analysis target to FALSE.

The model feature quantity computing unit 18 extracts the feature quantity of the image data that is received as the learning target, and computes the model feature quantity of the designated scene using the extracted feature quantity. In the digital photo frame 100 of the third embodiment, the model feature quantity computing unit 18 re-computes the average value of the feature quantity while the newly-extracted feature quantity is included in the already-produced model feature quantity, and the model feature quantity computing unit 18 updates the model feature quantity of the designated scene.

For example, assuming that X is a model feature quantity of the scene "landscape" at the present moment, N is the number of (feature quantities) of the pieces of sample image data of the "landscape" that is the origin of the model feature quantity X, and Y is a feature quantity of the newly-extracted image data A, when image data A of the learning target is inputted while the scene "landscape" is designated, the model feature quantity computing unit 18 produces the model feature quantity of the new "landscape" from the following equation, and the model feature quantity computing unit 18 updates the model feature quantity of the scene feature quantity storage unit 31:

$$(X*N+Y)/(N+1) \quad \text{(equation 1)}$$

The equation 1 is applied to the case where the number of pieces of data of the feature quantity Y is 1, that is, one piece of image data A. The feature quantity X and the feature quantity Y are vector quantities. For example, the feature quantity X and the feature quantity Y indicate the histograms.

According to the configuration, in performing the scene learning function, the character region extracting unit 11 performs the character region extracting processing as pre-processing to the image data that becomes the learning target. The model feature quantity computing unit 18 produces the model feature quantity based on the feature quantity that is obtained by excluding the pixel out of the processing target specified by the target pixel specifying unit 12.

Therefore, the model feature quantity in which the adverse effect of the heterogeneous matter is removed can be obtained even if the image data including the heterogeneous matter (the character such as the telop) is inconveniently mixed in the image data of the learning target. As a result, the scene discrimination accuracy of the image attribute discrimination apparatus 10 can be improved.

The restoration unit 15 may perform the restoration processing to the pixel that is excluded from the feature quantity extracting target by the target pixel specifying unit 12. For example, the restoration unit 15 can restore the original background hidden behind the character string. Therefore, higher-reliability model feature quantity can be produced.

[Scene Learning Processing Flow]

Figure 14:
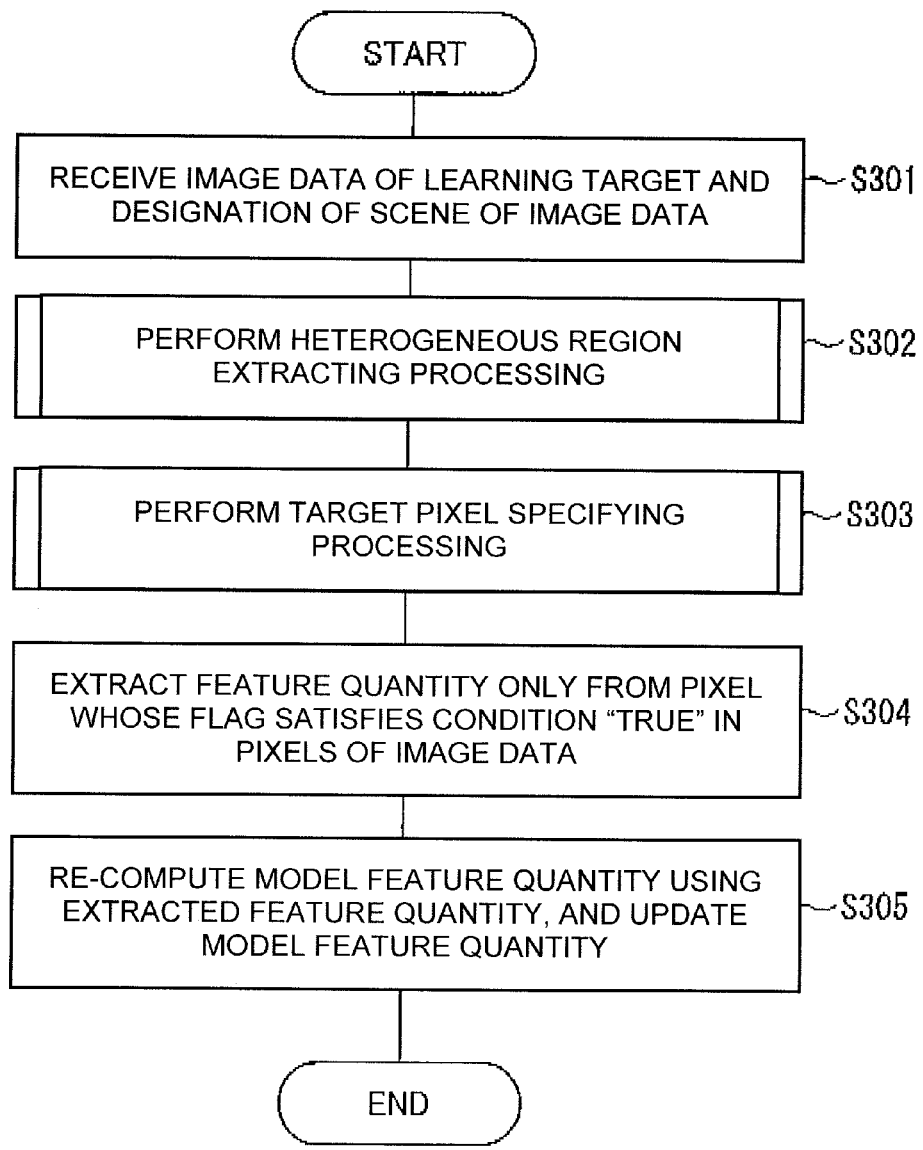
FIG. 14 is a flowchart showing an example of a scene learning processing flow of the digital photo frame of another embodiment of the present invention.

FIG. 14 is a flowchart showing a scene learning processing flow of the digital photo frame 100 of the third embodiment.

The attribute discrimination support apparatus 20 receives the designation of the correct scene (set to "landscape", in this case) correlated with the image data along with the input of the image data (set to Fujiyama.jpg shown in FIG. 3A, also in this case) that becomes the learning target (S301).

The character region extracting unit 11 performs the heterogeneous region (character region, in this case) extracting processing to the image data (Fujiyama.jpg) (S302). The character region extracting processing is performed in the procedure similar to that of the first and second embodiments. For example, as shown in FIG. 3B, it is assumed that the three character regions of the first character region Ar1 to third character region Ar3 are extracted.

The target pixel specifying unit 12 performs the target pixel specifying processing to each pixel belonging to the extracted character region in order to specify whether the pixel belonging to the extracted character region becomes the pixel of the feature quantity extracting target for the scene learning (S303). In the third embodiment, whether each pixel of the character region becomes the feature quantity extracting target (TRUE) or does not become the feature quantity extracting target (FALSE) is specified in the procedure similar to that in S205 to S210 of FIG. 10A. That is, the target pixel specifying unit 12 sets each pixel in the character region to the pixel of the feature quantity extracting target when there is a high possibility that the character region does not actually include the character, and the target pixel specifying unit 12 sets each pixel in the pixel out of the feature quantity extracting target when there is a high possibility that the character region includes the character.

The model feature quantity computing unit 18 extracts feature quantity (for example, produces the histogram) only from the pixel whose flag satisfies the condition "TRUE" in the pixels of the image data (Fujiyama.jpg) (S304). The model feature quantity computing unit 18 reads the model feature quantity of the scene ("landscape", in this case) received in S301 from the scene feature quantity storage unit 31, and the model feature quantity computing unit 18 re-computes the model feature quantity based on the feature quantity extracted in S304 to update the model feature quantity (S305). For example, the model feature quantity computing unit 18 computes the average value of the color histograms obtained from the pieces of sample image data of the landscape including the image data (Fujiyama.jpg), and updates the color histogram as the new model histogram of the scene "landscape".

According to the above method, in performing the scene learning function, when the image data that becomes the learning target includes the heterogeneous region such as the character (string), the feature quantity obtained from the pixel group except the heterogeneous region can be added to the model feature quantity of the designated scene.

Therefore, the model feature quantity can be produced more precisely, so that the image attribute discrimination apparatus 10 can accurately perform the scene discrimination.

In the second embodiment, when the extracted character region is small, the target pixel specifying processing (processing of determining whether the flag is set to TRUE or FALSE) is omitted in order to perform efficiently the scene discrimination processing. However, in the third embodiment, even if the small character region is extracted from the image data, when the extracted character region is the heterogeneous region, preferably the flag is set to FALSE to exclude the heterogeneous region from the target pixel. This is attributed to the fact that, while the small character region has the small adverse effect when the correct scene is discriminated for one piece of image data in the second embodiment, accumulation of the small character regions possibly obstructs the production of the precise model feature quantity when the model feature quantity of one scene is produced using many pieces of image data in the third embodiment.

The attribute discrimination support apparatus 20 may further include the restoration unit 15. The restoration unit 15 performs the restoration processing to the character region, when the area (area of character region) of the pixels having the flag "FALSE" specified by target pixel specifying unit 12 in S303 is larger than a predetermined threshold. The target pixel specifying unit 12 sets the flag of the pixels in the restored region to TRUE to enlarge the area of the target pixel. Therefore, more identical pixels can be set to the feature quantity extracting target, and the reliability of the produced model feature quantity can further be enhanced.

Figure 15:
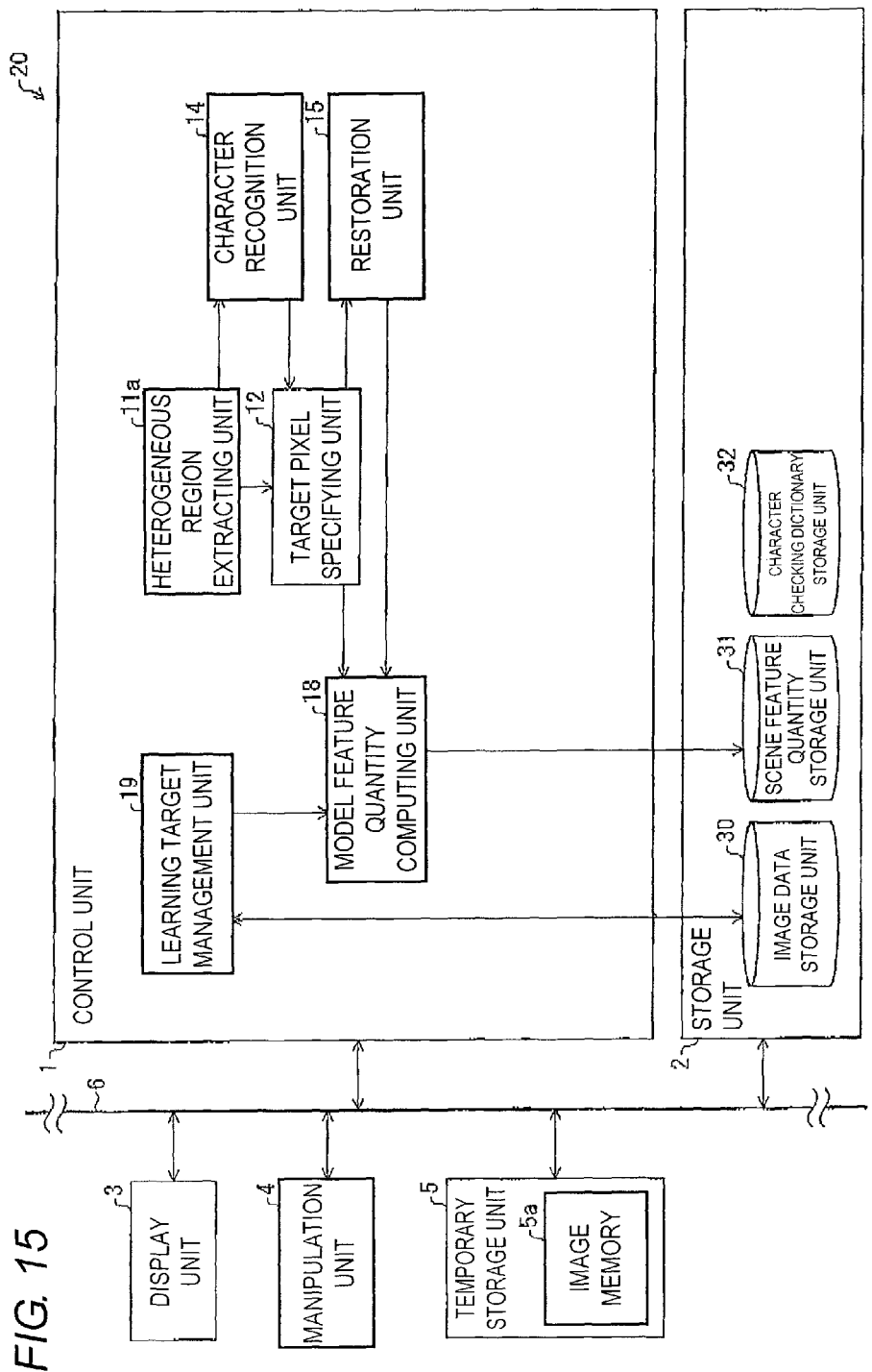
FIG. 15 is a block diagram showing a configuration of a main part of an attribute discrimination support apparatus according to another embodiment of the present invention.

FIG. 15 is a block diagram showing a configuration of a main part of an attribute discrimination support apparatus 20 that produces the model feature quantity mounted on the scene feature quantity storage unit 31 of the digital photo frame 100 of the third embodiment. The attribute discrimination support apparatus 20 is realized by various pieces of information processing apparatus such as a server suitable to process a large amount of image data, a personal computer, and a super computer. The reference numeral of each constituent of FIG. 15 corresponds to the reference numeral of each constituent of FIGS. 1 and 13, and the same reference numeral expresses the constituent having the same function. Accordingly, the overlapping description of the constituent that is already described in the embodiments will not be given.

The display unit 3 displays the manipulation screen as the GUI (Graphical User Interface) screen in order that the user registers a large amount of image data or designates the scene. For example, a list of icons is displayed in order to manipulate the image data of the learning target, the image data registered in the image data storage unit 30 is displayed in the thumbnail form, or the GUI screen is displayed such that the user conveniently performs the scene learning function.

The manipulation unit 4 is used when the user manipulates the attribute discrimination support apparatus 20. For example, the manipulation unit 4 is realized by a mouse and a keyboard. Specifically, the user manipulates the mouse to collectively select the pieces of image data of many newly-registered samples displayed on the display unit 3, and the user can store the pieces of image data in a folder of the specific scene "landscape" by drag and drop. Therefore, the user can designate the scene to register the large amount of image data at one time, and the user can cause the attribute discrimination support apparatus 20 to learn the feature of the scene by a simple manipulation.

The control unit 1 performs various arithmetic operations by performing the program that is read in the temporary storage unit 5 from the storage unit 2, and the control unit 1 wholly controls the units of the attribute discrimination support apparatus 20 through the bus 6. The control unit 1 includes at least a heterogeneous region extracting unit 11a, the target pixel specifying unit 12, and the model feature quantity computing unit 18 as the functional blocks. The control unit 1 may further include a learning target management unit 19, the character recognition unit 14, and the restoration unit 15. Each of the functional blocks performs the scene learning function of the attribute discrimination support apparatus 20. Each functional block of the control unit 1 can be realized, such that the CPU (Central Processing Unit) reads a program stored in the storage unit 2 implemented by the ROM (Read Only Memory) to the temporary storage unit 5 implemented by the RAM (Random Access Memory) and executes the program.

The heterogeneous region extracting unit 11a extracts the heterogeneous region included in the image data of the learning target. In the above embodiments, the character region extracting unit 11 extracts the character region including the character (string) as the heterogeneous region. However, the heterogeneous region extracting unit 11a is configured to extract not only the character region but also the heterogeneous region including any heterogeneous matter. A specific example of the heterogeneous region except the character region is described later. In the attribute discrimination support apparatus 20 of the third embodiment, not only the character (string) but also the image data including any heterogeneous matter that is not suitable to the sample are possibly mixed when the large amount of sample image data is read at one time in order to produce the model feature quantity. Therefore, preferably the heterogeneous region extracting unit 11a can detect any kind of the heterogeneous matter from the features such as the color and texture.

The learning target management unit 19 receives the learning instruction from the user. The learning target management unit 19 manages the large amount of image data of the learning target inputted thereto along with the information on the designated scene while storing the image data of the learning target and the information on the designated scene in the image data storage unit 30. In extracting the feature quantity, the image data stored by the learning target management unit 19 is expanded one by one on the image memory 5a by the model feature quantity computing unit 18. The learning target management unit 19 transmits what is correct scene of the expanded image data to the model feature quantity computing unit 18.

The model feature quantity computing unit 18 extracts the feature quantities of the plurality of pieces of sample image data from one scene inputted thereto in the similar procedure, and computes the model feature quantity based on the feature quantities.

For example, when the pieces of image data of 100 samples are inputted along with the learning instruction while correlated with the scene "landscape", the learning target management unit 19 stores the 100 pieces of image data in the image data storage unit 30 while correlating the 100 pieces of image data with the scene "landscape". The heterogeneous region extracting unit 11a detects the heterogeneous region of one piece of image data expanded on the image memory 5a, and the target pixel specifying unit 12 sets the flag (FALSE) to each pixel in order to exclude the heterogeneous region.

The model feature quantity computing unit 18 extracts the feature quantity only from the pixel having the flag "TRUE" with respect to the image data. The model feature quantity computing unit 18 produces the average value of the feature quantities of all the 100 pieces of image data obtained in the similar manner as the model feature quantity of the scene "landscape". The model feature quantity produced by the model feature quantity computing unit 18 is once stored in the scene feature quantity storage unit 31, and the model feature quantity is mounted on each digital photo frame 100 in production process by appropriate means.

According to the configuration, even if the image data including the heterogeneous region is included in the sample used to produce the model feature quantity, the image data including the heterogeneous region is excluded, and the model feature quantity is produced based on the feature obtained from the identical pixel. The precise model feature quantity suitable to the designated scene can be mounted on the digital photo frame 100, and therefore the digital photo frame 100 can accurately perform the scene discrimination processing.

As described above, the heterogeneous region extracting unit 11a detects not only the character (string) but also various heterogeneous matters, and the heterogeneous region extracting unit 11a can extract the heterogeneous region including the heterogeneous matters. FIGS. 16 to 19 show specific examples of various heterogeneous regions.

Figure 16:
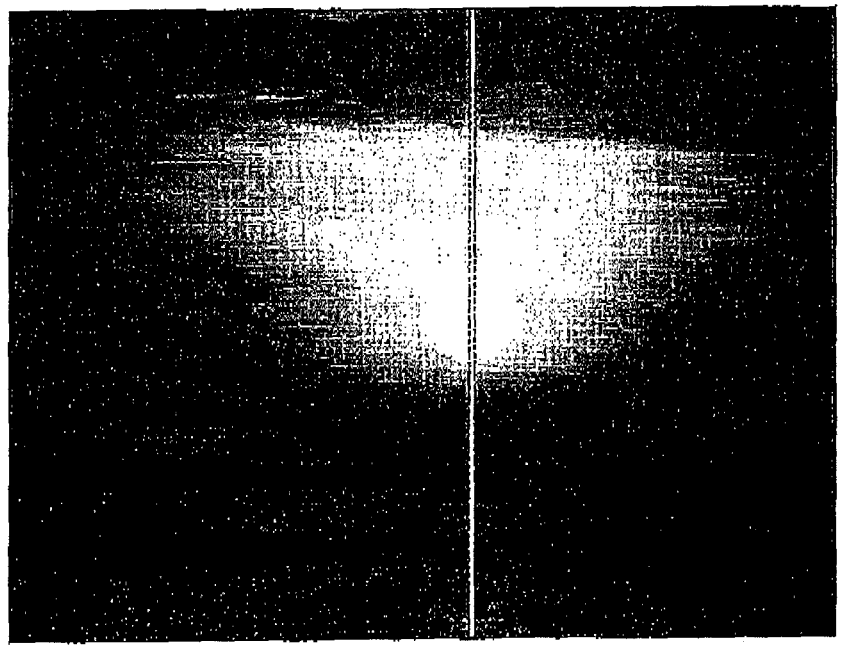
FIG. 16 is a view showing an example of image data including a smear as a heterogeneous region.
Figure 17:
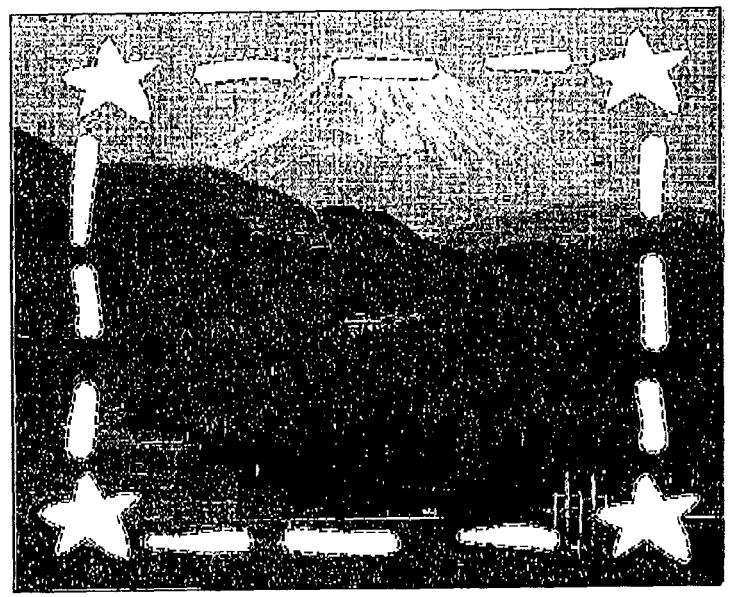
FIG. 17 is a view showing an example of image data including a region where an object as the heterogeneous region is merged in an image edit process.
Figure 18:
FIG. 18 is a view showing an example of image data including a folded portion as the heterogeneous region because an original is scanned while an end of the original is folded.
Figure 19:
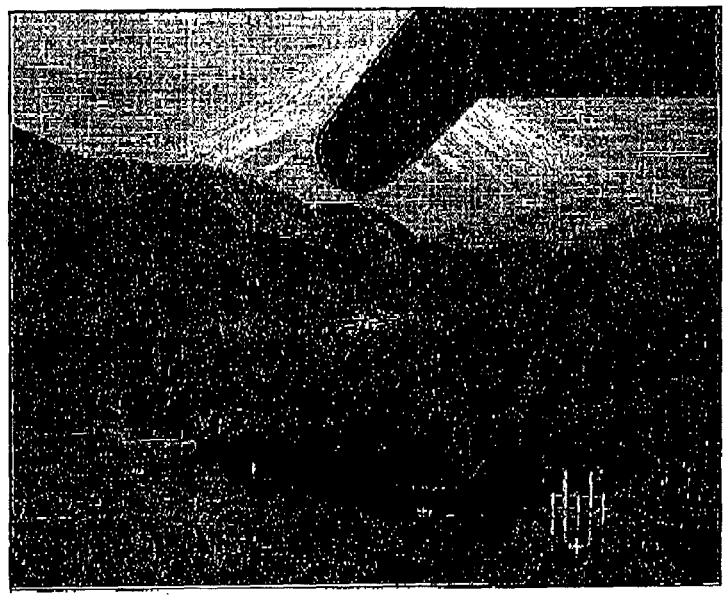
FIG. 19 is a view showing an example of image data including a finger shadow taken in a photograph as the heterogeneous region.

FIG. 16 is a view showing an example of the image data in which a smear (a white-spot region in a broken-line frame) is generated due to an environment in taking the photograph or subject state. FIG. 17 is a view showing an example of the image data in which the objects such as graffiti (hand writing edit with a touch pen), an illustration, and a stamp are merged in the image edit process. FIG. 18 is a view showing an example of the image data in which an original is scanned while an end of the original is folded. FIG. 19 is a view showing an example of the image data in which a finger of a photographer is taken in a photograph upon taking the photograph.

The heterogeneous region extracting unit 11a detects that the attribute of the region in the broken-line frame is different from that of other regions based on the difference in color or texture, and the heterogeneous region extracting unit 11a extracts the detected region as the heterogeneous region.

According to the configuration, when extracting the feature quantity, the model feature quantity computing unit 18 can deal with various heterogeneous matters that have the adverse effect on the scene discrimination, and the model feature quantity is computed while various heterogeneous matters are removed. Accordingly, the model feature quantity can be obtained more precisely, and therefore the accuracy of the scene discrimination result of the image attribute discrimination apparatus 10 can further be improved.

The image attribute discrimination apparatus 10 may include the heterogeneous region extracting unit 11a. In such cases, even if the heterogeneous matter is included in the image data in addition to the character, the scene discrimination processing can correctly be performed irrespective of the heterogeneous matter.

One or more embodiments of the present invention are not limited to the above embodiments, but various changes can be made without departing from the scope of the invention. An embodiment obtained by appropriately combining technical means disclosed in different embodiments are also included in the technical range of the invention.

Finally, each block of the image attribute discrimination apparatus 10 and attribute discrimination support apparatus 20, particularly the heterogeneous region extracting unit 11a, the character region extracting unit 11, the target image specifying unit 12, the scene discrimination unit 13, and the model feature quantity computing unit 18 may be formed by hardware logic or may be realized as follows by software using the CPU as follows.

That is, each of the image attribute discrimination apparatus 10 and the attribute discrimination support apparatus 20 includes the CPU (Central Processing Unit) that executes a command of a control program realizing each function, the ROM (Read Only Memory) in which the program is stored, the RAM (Random Access Memory) in which the program is expanded, and the storage device (recording medium) such as a memory in which the program and various pieces of data are stored. Program codes (an executable format program, an intermediate code program, and a source program) of the control programs that are the software realizing the functions in the image attribute discrimination apparatus 10 (or the attribute discrimination support apparatus 20) are recorded in the recording medium while the computer can read the program codes, the recording medium is supplied to the image attribute discrimination apparatus 10 (or the attribute discrimination support apparatus 20), and the computer (or the CPU or MPU) reads and executes the program code recorded in the recording medium.

Examples of the recording medium include tape system such as magnetic tape and cassette tape, disk systems including magnetic disks such as floppy disk (registered trademark) and a hard disk and optical disks such as a CD-ROM, an MO, an MD, a DVD, and a CD-R, card systems such as an IC card (including a memory card) and an optical card, and semiconductor memory systems such as a mask ROM, an EPROM, an EEPROM and a flash ROM.

The image attribute discrimination apparatus 10 (or the attribute discrimination support apparatus 20) is configured to be able to be connected to a communication network, and the program code may be supplied through the communication network. There is no particular limitation to the transmission medium constituting the communication network. Examples of the communication network include the Internet, an intranet, an extranet, a LAN, an ISDN, a VAN, a CATV communication network, a virtual private network, a telephone line network, a mobile communication network, and a satellite communication network. Examples of the transmission medium include a wired medium such as IEEE1394, USB, power-line carrier, a cable TV line, a telephone line, and an ADSL line and a wireless medium such as an infrared ray such as IrDA and a remote controller, Bluetooth (registered trademark), 802.11 wireless, HDR, a mobile telephone network, a satellite line, and a terrestrial digital network. One or more embodiments of the present invention can also be realized by a mode of a computer data signal buried in a carrier wave, in which the program code is implemented by electronic transmission.

According to the image attribute discrimination apparatus and attribute discrimination support apparatus of one or more embodiments of the present invention, the attribute of the image data is accurately discriminated, so that the image attribute discrimination apparatus and the attribute discrimination support apparatus can suitably be applied to various pieces of image processing apparatus that perform the processing to the image data attribute by attribute according to the discrimination result of the attribute. For example, one or more embodiments of the present invention can be used in the digital photo frame, the digital camera, the digital video camera, the digital video recorder/player, the digital television, the personal computer, the printer, and the scanner.

What is claimed is:

1. An image attribute discrimination apparatus that discriminates an attribute of image data based on a content produced by the image data, the image attribute discrimination apparatus comprising:
    a heterogeneous region specifying hardware logic that specifies a character region including a character as a heterogeneous region from the image data of a still image based on a determination whether the image data of the still image contains the heterogeneous region, wherein the heterogeneous region comprises a heterogeneous matter whose attribute is different from that of the content originally produced by the image data;
    an attribute discrimination hardware logic that, if the image data contains the heterogeneous region, discriminates the attribute of the image data based on a feature quantity extracted from a pixel group except each pixel in the heterogeneous region in each pixel of the image data and excludes data of the heterogeneous region from the remaining of the image data, wherein the attribute is a characteristic of a scene shown by the image data;
    a restoration hardware logic that restores a pixel identical to a target pixel with respect to an out-of-target pixel region in each pixel of the image data, wherein the out-of-target region does not become a feature quantity extracting target; and
    a target pixel determination hardware logic that determines whether each pixel in the heterogeneous region specified by the heterogeneous region specifying hardware logic is the target pixel whose feature quantity is extracted by the attribute discrimination hardware logic, wherein the attribute discrimination hardware logic discriminates the attribute of the image data based on the feature quantity extracted from the pixel group except the out-of-target pixel in each pixel of the image data, and the out-of-target pixel is determined to be out of the target by the target pixel determination hardware logic.

2. The image attribute discrimination apparatus according to claim 1,
wherein the heterogeneous region specifying hardware logic specifies the character region including the character as the heterogeneous region,
wherein the image attribute discrimination apparatus further includes a character recognition hardware logic that recognizes the character in the character region specified by the heterogeneous region specifying hardware logic, and
wherein the target pixel determination hardware logic that determines the pixel in the character region as the target pixel, when a degree of reliability of a character recognition result is not more than a predetermined value, wherein the degree of reliability indicates likelihood that the character in the character region is the character recognized by the character recognition hardware logic.

3. The image attribute discrimination apparatus according to claim 2, further comprising:
a keyword extracting hardware logic that extracts a keyword, the character or character string recognized by the character recognition hardware logic; and
a word association storage hardware logic in which association between each keyword extracted by the keyword extracting hardware logic and each attribute discriminated by the attribute discrimination hardware logic is stored,
wherein the attribute discrimination hardware logic refers to the word association storage hardware logic, and
wherein the attribute discrimination hardware logic discriminates the attribute of the image data in consideration of a level of association between the keyword extracted from the character region of the image data and each attribute.

4. The image attribute discrimination apparatus according to claim 3,
wherein the attribute discrimination hardware logic checks the feature quantity of the image data against a model feature quantity that is previously defined in each plurality of kinds of attributes,
wherein the attribute discrimination hardware logic discriminates the attribute of the image data by computing a degree of reliability of an attribute discrimination result according to a degree of similarity between the feature quantity of the image data and the model feature quantity, the degree of reliability indicating likelihood that the attribute of the image data is the attribute, and
wherein the association between the keyword and the attribute is stored in the word association storage hardware logic as a score added to the degree of reliability of the attribute discrimination result.

5. The image attribute discrimination apparatus according to claim 4,
wherein the restoration hardware logic performs the restoration when the degree of reliability of the attribute discrimination result is lower than a predetermined value.

6. The image attribute discrimination apparatus according to claim 4, wherein the attribute discrimination hardware logic computes the degree of reliability lower with increasing region of the out-of-target pixel that does not becomes the feature quantity extracting target in each pixel of the image data.

7. The image attribute discrimination apparatus according to claim 1, wherein the target pixel determination hardware logic determines each pixel in the heterogeneous region as the out-of-target pixel only when an area occupied by the heterogeneous region in the image data is more than a predetermined value.

8. The image attribute discrimination apparatus according to claim 1, further comprising:
a model feature quantity computing hardware logic that computes a model feature quantity of a designated attribute using the feature quantity extracted from the pixel group except each pixel in the heterogeneous region specified by the heterogeneous region specifying hardware logic in each pixel of the image data, when image data and the designation of the attribute of the image data are inputted to the image attribute discrimination apparatus,
wherein the attribute discrimination hardware logic checks the feature quantity of the image data against the model feature quantity computed in each attribute by the model feature quantity computing hardware logic, and
wherein the attribute discrimination hardware logic discriminates the attribute of the image data according to a degree of similarity between the feature quantity of the image data and the model feature quantity.

9. An image attribute discrimination method for discriminating an attribute of image data based on a content produced by the image data, the image attribute discrimination method comprising the steps of:
specifying a character region including a character as a heterogeneous region from the image data of a still image based on a determination whether the image data of the still image contains the heterogeneous region, wherein the heterogeneous region further comprises a heterogeneous matter whose attribute is different from that of the content originally produced by the image;
discriminating the attribute of the image data based on a feature quantity extracted from a pixel group except each pixel in the heterogeneous region in each pixel of the image data and excluding data of the heterogeneous region from the remaining of the image data, if the image data contains the heterogeneous region; and
restoring a pixel identical to a target pixel with respect to an out-of-target pixel region in each pixel of the image data, wherein the out-of-target region does not become a feature quantity extracting target,
wherein the image data is stored in a data storage hardware logic and the content produced by the image data is displayed by a display device,
wherein the attribute is a characteristic of a scene shown by the image data, and
wherein the image attribute discrimination method further comprises determining whether each pixel in the specified heterogeneous region is the target pixel whose feature quantity is extracted in the discriminating, wherein the discriminating discriminates the attribute of the image data based on the feature quantity extracted from the pixel group except the out-of-target pixel in each pixel of the image data, the out-of-target pixel is determined to be out of the target in the determining.

10. A non-transitory computer readable medium comprising a control program that causes a computer to perform steps of:
specifying a character region including a character as a heterogeneous region from the image data of a still image based on a determination whether the image data of the still image contains the heterogeneous region, wherein the heterogeneous region further comprises a heterogeneous matter whose attribute is different from that of the content originally produced by the image;

discriminating the attribute of the image data based on a feature quantity extracted from a pixel group except each pixel in the heterogeneous region in each pixel of the image data and excluding data of the heterogeneous region from the remaining of the image data, if the image data contains the heterogeneous region; and restoring a pixel identical to a target pixel with respect to an out-of-target pixel region in each pixel of the image data, wherein the out-of-target re ion does not become a feature quantity extracting target, wherein the image data is stored in a data storage hardware logic and the content produced by the image data is displayed by a display device, wherein the attribute is a characteristic of a scene shown by the image data, and wherein the control program causes the computer to further perform determining whether each pixel in the specified heterogeneous region is the target pixel whose feature quantity is extracted in the discriminating, wherein the discriminating discriminates the attribute of the image data based on the feature quantity extracted from the pixel group except the out-of-target pixel in each pixel of the image data, and the out-of-target pixel is determined to be out of the target in the determining.

* * * * *